United States Patent
Takemoto

(10) Patent No.: US 9,709,781 B2
(45) Date of Patent: Jul. 18, 2017

(54) ZOOM LENS AND IMAGE PICKUP APPARATUS INCLUDING THE SAME

(71) Applicant: CANON KABUSHIKI KAISHA, Tokyo (JP)

(72) Inventor: Shoichi Takemoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 96 days.

(21) Appl. No.: 14/827,797

(22) Filed: Aug. 17, 2015

(65) Prior Publication Data

US 2016/0054549 A1    Feb. 25, 2016

(30) Foreign Application Priority Data

Aug. 21, 2014 (JP) .................. 2014-168478

(51) Int. Cl.
| | | |
|---|---|---|
| G02B 15/167 | (2006.01) | |
| H04N 5/232 | (2006.01) | |
| H04N 5/225 | (2006.01) | |
| G02B 15/16 | (2006.01) | |

(52) U.S. Cl.
CPC ......... *G02B 15/167* (2013.01); *G02B 15/161* (2013.01); *H04N 5/2254* (2013.01); *H04N 5/23296* (2013.01)

(58) Field of Classification Search
CPC .. G02B 15/167; G02B 15/161; H04N 5/2254; H04N 5/23296
USPC ........ 359/683–684, 687–688, 695, 750–758, 359/763–766, 772–778
See application file for complete search history.

(56) References Cited

U.S. PATENT DOCUMENTS

| | | |
|---|---|---|
| 6,278,559 B1 | 8/2001 | Yahagi |
| 2008/0130141 A1 | 6/2008 | Ishibashi |

(Continued)

FOREIGN PATENT DOCUMENTS

| | | |
|---|---|---|
| JP | 2004-085846 A | 3/2004 |
| JP | 2007-139858 A | 6/2007 |

OTHER PUBLICATIONS

Great Britain search report issued in corresponding application No. 1514594.9 on Jan. 25, 2016.

(Continued)

*Primary Examiner* — Jordan Schwartz
*Assistant Examiner* — George G King
(74) *Attorney, Agent, or Firm* — Carter, DeLuca, Farrell & Schmidt, LLP

(57) ABSTRACT

A zoom lens including, in order from object side, a positive first lens unit not moving for zooming, a negative second lens unit moving during zooming, at least one other lens unit moving during zooming as at least a third lens unit, and a rearmost lens unit closest to an image side not moving for zooming, and also including an aperture stop at the image side of the second lens unit, average values of Abbe numbers and relative partial dispersions of each of positive lenses and negative lenses forming the second lens unit, anomalous dispersion of a lens having a smallest Abbe number of negative lenses forming the rearmost lens unit, an axial distance between surface vertex positions of lenses closest to the object and image sides of the zoom lens, and a distance between the aperture stop and the negative lens at a wide angle end are appropriately set.

8 Claims, 13 Drawing Sheets

(56) References Cited

U.S. PATENT DOCUMENTS

| | | | |
|---|---|---|---|
| 2010/0085647 A1* | 4/2010 | Nurishi | G02B 15/173 |
| | | | 359/687 |
| 2012/0134031 A1* | 5/2012 | Eguchi | G02B 15/173 |
| | | | 359/686 |
| 2015/0316755 A1* | 11/2015 | Takemoto | G02B 15/16 |
| | | | 359/683 |

OTHER PUBLICATIONS

German office action issued in corresponding application No. 102015010705.4 on May 26, 2017.

* cited by examiner

ZOOM LENS AND IMAGE PICKUP APPARATUS INCLUDING THE SAME

BACKGROUND OF THE INVENTION

Field of the Invention

The present invention relates to a zoom lens and an image pickup apparatus including the zoom lens, which are particularly suitable for use in a broadcasting television camera, a cinema camera, a video camera, and a digital still camera.

Description of the Related Art

In recent years, as an image pickup apparatus such as a television camera, a cinema camera, a video camera, or a film camera, a large format camera having features of a shallow depth of field and beautiful bokeh (blur) quality for expanding visual expression is used. As a zoom lens to be attached to the large format camera, a small and lightweight zoom lens having a high zoom ratio for securing mobility and improving flexibility in photography has been in demand. In addition, an image pickup element having a large number of pixels has been used as an image pickup element of the camera, and hence the zoom lens is required to have high performance accommodating an increased definition. As a zoom lens having the high zoom ratio, as proposed in Japanese Patent Application Laid-Open No. 2007-139858 and Japanese Patent Application Laid-Open No. 2004-085846, there has been known a zoom lens of a positive lead type in which a lens unit having a positive refractive power is arranged closest to an object side, and which includes at least four lens units as a whole.

In Japanese Patent Application Laid-Open No. 2007-139858, a zoom lens including four lens units and having an angle of field at a telephoto end of about 0.7 degrees and a zoom ratio of about 15× has been proposed.

In Japanese Patent Application Laid-Open No. 2004-085846, a zoom lens including four lens units and having an angle of field at a telephoto end of about 1.6 degrees and a zoom ratio of about 3× has been proposed.

A problem, which arises in realizing the high zoom ratio of the zoom lens, is increased variations in various aberrations accompanying zooming. In particular, when a variation in lateral chromatic aberration due to zooming is increased, it becomes difficult to satisfactorily correct the lateral chromatic aberration over an entire zoom range, and to obtain a high definition image.

A problem for the zoom lens in each of Japanese Patent Application Laid-Open No. 2007-139858 and Japanese Patent Application Laid-Open No. 2004-085846 in realizing the high zoom ratio while accommodating a large format sensor is that, because the variation in lateral chromatic aberration due to zooming is increased accompanying the increase in zoom ratio, it is difficult to satisfactorily correct the lateral chromatic aberration over the entire zoom range.

In order to satisfactorily correct the lateral chromatic aberration over the entire zoom range while realizing the high zoom ratio, it is important that a lens configuration of a second lens unit be devised to suppress the variation in lateral chromatic aberration due to zooming, and that a configuration of a lens unit closest to the image side be devised to adjust the lateral chromatic aberration at a wide angle end.

SUMMARY OF THE INVENTION

The present invention provides a zoom lens, which is compatible with a large format sensor and in which lateral chromatic aberration is satisfactorily corrected over an entire zoom range while having a high zoom ratio, by appropriately setting lens configurations of a second lens unit and a lens unit closest to an image side, and an image pickup apparatus including the zoom lens.

According to one embodiment of the present invention, there is provided a zoom lens, including:

a first lens unit having a positive refractive power that does not move for zooming;

a second lens unit having a negative refractive power that moves during zooming;

at least one other lens unit that moves during zooming as at least a third lens unit;

a rearmost lens unit disposed closest to an image side that does not move for zooming, the first lens unit, the second lens unit, the at least one other lens unit, and the rearmost lens unit being arranged in the stated order from an object side to the image side; and an aperture stop arranged in the image side of the second lens unit, wherein the following conditions are satisfied:

$$-2.00\times10^{-3}<(\theta gf2p-\theta gf2n)/(vd2p-vd2n)<-0.80\times10^{-3};$$

$$0.0180<\Delta\theta gfrn1<0.070;\text{ and}$$

$$0.10<Drn1/TD<0.40,$$

where $vd2p$ and $vd2n$ respectively represent average values of Abbe numbers of positive lenses and negative lenses forming the second lens unit, $\theta gf2p$ and $\theta gf2n$ respectively represent average values of relative partial dispersions of the positive lenses and the negative lenses forming the second lens unit, $\Delta\theta gfrn1$ represents anomalous dispersion of a lens (Lrn1) having a smallest Abbe number of negative lenses forming the rearmost lens unit, TD represents a distance on an optical axis from a surface vertex position of a lens surface closest to the object side of the zoom lens to a surface vertex position of a lens surface closest to the image side of the zoom lens, and $Drn1$ represents a distance between the aperture stop and the lens having the smallest Abbe number at a wide angle end, provided that:

an Abbe number $vd$ is expressed as:

$$vd=(Nd-1)/(NF-NC),$$

where NF represents a refractive index with respect to an F-line, Nd represents a refractive index with respect to a d-line, and NC represents a refractive index with respect to a C-line, a relative partial dispersion $\theta gf$ is expressed as:

$$\theta gf=(Ng-NF)/(NF-NC),$$

where Ng represents a refractive index with respect to a g-line, and anomalous dispersion $\Delta\theta gf$ is expressed using the relative partial dispersion $\theta gf$ and the Abbe number $vd$ as:

$$\Delta\theta gf=\theta gf-(-1.6220\times10^{-3}\times vd+0.6416).$$

According to the one embodiment of the present invention, the zoom lens, which is compatible with a large format sensor and in which lateral chromatic aberration is satisfactorily corrected over the entire zoom range while having a high zoom ratio, and the image pickup apparatus including the zoom lens may be obtained.

Further features of the present invention will become apparent from the following description of embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

DESCRIPTION OF THE EMBODIMENTS

Figure 1:
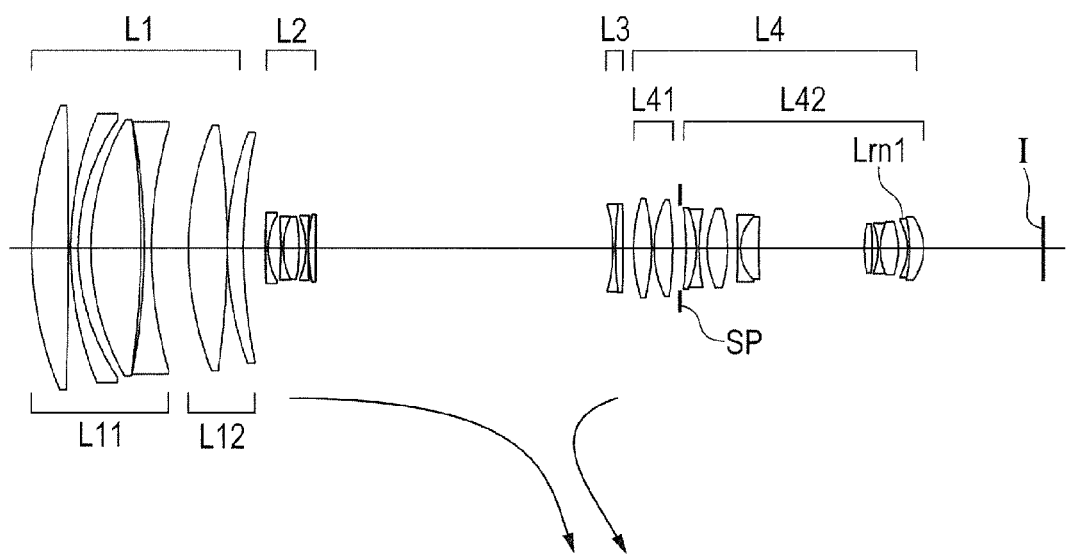
FIG. 1 is a lens cross-sectional view when focus is at infinity at a wide angle end in a zoom lens according to Embodiment 1.

Hereinafter, embodiments of the present invention are described in detail with reference to the accompanying drawings. A zoom lens according to the present invention includes, in order from an object side to an image side, a first lens unit having a positive refractive power, which is configured not to move for zooming. The zoom lens also includes a second lens unit having a negative refractive power, which is configured to move during zooming, at least one other lens unit including a lens unit configured to move during zooming, and a rearmost lens unit closest to the image side, which is configured not to move for zooming. The phrase "lens unit is configured not to move for zooming" as used herein means that the lens unit is not driven for the purpose of performing zooming but may be moved for focusing.

The zoom lens according to each Embodiment is compatible with a large format sensor and in which lateral chromatic aberration is satisfactorily corrected over an entire zoom range while having a high zoom ratio, by appropriately setting lens configurations of the second lens unit and the lens unit closest to the image side.

More specifically, the zoom lens according to the present invention includes, in order from the object side, the first lens unit having the positive refractive power, which is configured not to move for zooming, the second lens unit having the negative refractive power, which is configured to move during zooming, the at least one other lens unit including the lens unit configured to move during zooming as the third lens unit and subsequent lens units, and the rearmost lens unit closest to the image side, which is configured not to move for zooming. The zoom lens includes an aperture stop arranged in the image side of the second lens unit. Average values of Abbe numbers of positive lenses and negative lenses forming the second lens unit are respectively represented by vd2p and vd2n, and average values of relative partial dispersions of the positive lenses and the negative lenses forming the second lens unit are respectively represented by θgf2p and θgf2n. Moreover, anomalous dispersion of a lens Lrn1 having a smallest Abbe number among negative lenses constituting the rearmost lens unit closest to the image side is represented by ΔθgfrnI, and a distance on an optical axis between a surface vertex position of a lens surface closest to the object side of the zoom lens and a surface vertex position of a lens surface closest to the image side of the zoom lens is represented by TD. Further, when a distance from the aperture stop to the negative lens Lrn1 at a wide angle end is represented by Drn1, the zoom lens has a feature that the following conditions are satisfied:

$$-2.00 \times 10^{-3} < (\theta gf2p - \theta gf2n)/(vd2p - vd2n) < -0.80 \times 10^{-3} \quad (1);$$

$$0.0180 < \Delta\theta gfrn1 < 0.070 \quad (2); \text{ and}$$

$$0.10 < Drn1/TD < 0.40 \quad (3).$$

Provided that an Abbe number vd and a relative partial dispersion θgf are respectively expressed as:

$$vd = (Nd-1)/(NF-NC), \quad (i)$$

$$\theta gf = (Ng-NF)/(NF-NC), \quad (ii)$$

where NF, Nd, NC and Ng respectively represent a refractive index with respect to F-line (486.1 nm), d-line (587.6 nm), C-line (656.3 nm) and g-line (435.8 nm) of Fraunhofer line.

Anomalous dispersion Δθgf is expressed using the relative partial dispersion θgf and the Abbe number vd as:

$$\Delta\theta gf = \theta gf - (-1.6220 \times 10^{-3} \times vd + 0.6416).$$

The conditional expression (1) defines a relationship between the average values vd2p and vd2n of the Abbe numbers and the average values θgf2p and θgf2n of the relative partial dispersions of the positive lenses and the negative lenses forming the second lens unit.

The relative partial dispersion θgF of an existing optical material is present in a narrow range with respect to the Abbe number vd. Further, the existing optical material has a tendency that, the smaller the Abbe number vd becomes, the larger the relative partial dispersion θgF becomes; that is, the larger the Abbe number vd becomes, the smaller the refractive index becomes. Here, a condition for correcting a chromatic aberration in a thin-contact lens system including two lenses 1 and 2 respectively having refractive powers $\phi1$ and $\phi2$ and Abbe numbers v1 and v2 is expressed by the following expression.

$$\phi1/v1 + \phi2/v2 = E \quad (iii)$$

In this case, a combined refractive power $\phi$ of the lenses 1 and 2 is expressed by the following expression.

$$\phi = \phi1 + \phi2 \quad (iv)$$

When E=0 is satisfied in expression (iii), imaging positions of the C-line and the F-line match each other in correcting the chromatic aberration. At this time, $\phi1$ and $\phi2$ are respectively expressed by the following expressions.

$$\phi1 = \phi \times v1/(v1-v2) \quad (v)$$

$$\phi2 = \phi \times v2/(v1-v2) \quad (vi)$$

Figure 14:
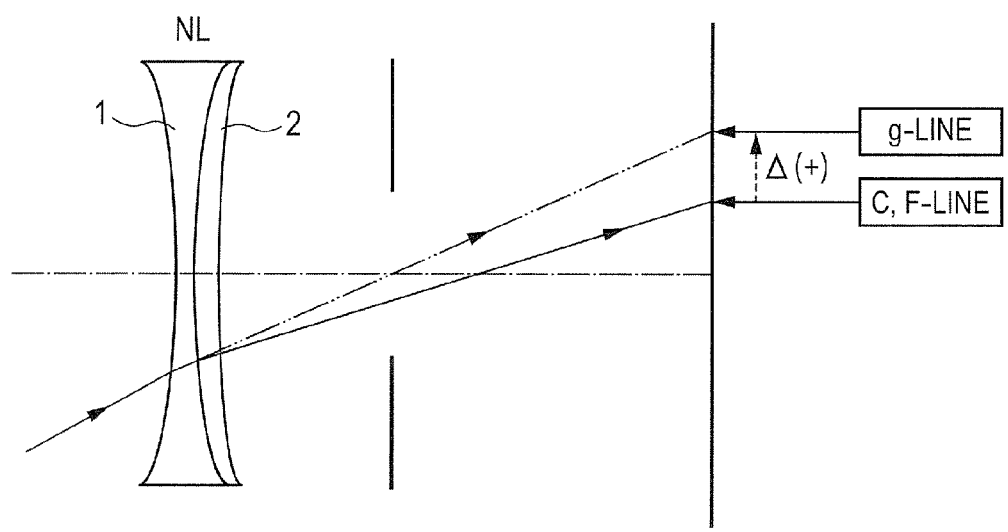
FIG. 14 is a schematic diagram regarding two-color chromatic aberration correction and a residual secondary spectrum of lateral chromatic aberration of a negative lens unit on an object side of an aperture stop.

FIG. 14 is a schematic diagram regarding two-color chromatic aberration correction and a residual secondary spectrum of a lateral chromatic aberration of a lens unit NL having a negative refractive power and arranged between an object plane and the aperture stop. In order to correct the chromatic aberration of the negative lens unit NL illustrated in FIG. 14, a material having a large Abbe number v1 is used for a negative lens 1, and a material having a small Abbe number v2 is used for a positive lens 2. Therefore, the negative lens 1 has a small relative partial dispersion θ1 and the positive lens 2 has a large relative partial dispersion θ2. When the lateral chromatic aberration is corrected for the C-line and the F-line, an imaging point of the g-line shifts in a direction separated away from the optical axis. If an amount of the shift of the lateral chromatic aberration of the g-line with respect to the C-line and the F-line is defined as a secondary spectrum amount ΔY, the secondary spectrum amount ΔY is expressed by the following expression.

$$\Delta Y = (1/\phi) \times (\theta1 - \theta2)/(v1-v2) \quad (vii)$$

In order to satisfactorily correct the secondary spectrum of the lateral chromatic aberration over the entire zoom range, it is necessary to reduce an amount of the secondary spectrum generated in the second lens unit, which greatly affects the variations in the lateral chromatic aberration. The second lens unit has the negative refractive power. Hence, in order to satisfactorily correct the variation amount of the secondary spectrum of the lateral chromatic aberration over the entire zoom range, it is necessary to select such a glass material as to reduce the secondary spectrum amount ΔY.

The condition of the conditional expression (1) defines the relationship between the Abbe numbers and the relative partial dispersions of the positive lenses and the negative lenses forming the second lens unit in order to reduce ΔY.

When (θgf2p−θgf2n)/(vd2p−vd2n) exceeds the upper limit of the conditional expression (1), the secondary spectrum of the lateral chromatic aberration is advantageously corrected, but refractive indices of the negative lenses forming the second lens unit become low to reduce curvature radii of the negative lenses. As a result, higher-order aberrations of curvature of field and coma are increased, thereby being difficult to attain good optical performance. When the condition of the lower limit of the conditional expression (1) is not satisfied, the secondary spectrum of the lateral chromatic aberration is increased. As a result, it becomes difficult to satisfactorily correct chromatic aberration.

As described above, when a lens configuration of the second lens unit is configured to satisfy the conditional expression (1), the variation in lateral chromatic aberration due to zooming may be reduced. On the other hand, the secondary spectrum of the lateral chromatic aberration of the entire zoom lens becomes under (negative) at each zoom position, and hence the lateral chromatic aberration is overcorrected especially at a telephoto end. To address this problem, when a negative lens having a high relative partial dispersion is arranged in the lens unit closest to the image side, which is configured not to move during zooming, the secondary spectrum of the lateral chromatic aberration over an entire zoom range may be entirely shifted to under (positive) side, and hence the satisfactory correction of the lateral chromatic aberration may be attained over the entire zoom range.

The conditional expression (2) defines an anomalous dispersion ratio of the lens Lrn1 having the smallest Abbe number among the negative lenses forming the rearmost lens unit closest to the image side, and defines a condition for making the secondary spectrum of the lateral chromatic aberration positive at the wide angle end.

When Δθgfrn1 exceeds the upper limit of the conditional expression (2), an effect of making the secondary spectrum of the lateral chromatic aberration over (positive) at the wide angle end becomes smaller. As a result, the secondary spectrum of the lateral chromatic aberration becomes overcorrected at the telephoto end, thereby being difficult to obtain good image quality over the entire zoom range. To the contrary, when Δθgfrn1 falls below the lower limit of the conditional expression, the secondary spectrum of the lateral chromatic aberration becomes over (positive) and undercorrected at the wide angle end. As a result, it becomes difficult to obtain good image quality over the entire zoom range.

The conditional expression (3) defines a ratio of the distance of the lens Lrn1 having the smallest Abbe number of the negative lenses forming the rearmost lens unit closest to the image side from the aperture stop, and a total lens thickness. The term "total lens thickness" as used herein refers to a distance from a surface vertex position of the lens surface closest to the object side to a surface vertex position of the lens surface closest to the image side. When the conditional expression (3) is satisfied, an amount of generation of the secondary spectrum of the lateral chromatic aberration may be adjusted at the wide angle end without deteriorating a secondary spectrum of axial chromatic aberration.

When Drn1/TD exceeds the upper limit of the conditional expression (3), the distance of the lens Lrn1 from the stop becomes larger, with the result that a height of an off-axial ray entering the lens Lrn1 becomes to high, and the secondary spectrum of the lateral chromatic aberration becomes over (positive) and undercorrected at the wide angle end. As a result, it becomes difficult to obtain good image quality over the entire zoom range. When Drn1/TD falls below the lower limit of the conditional expression (3), the lens Lrn1 is arranged close to the stop, with the result that a ray height of an axial ray passing through the lens Lrn1 becomes higher, and the secondary spectrum of the axial chromatic aberration is deteriorated. As a result, it becomes difficult to obtain good image quality.

It is preferred to set the numerical value ranges of the conditional expressions (1) to (3) as follows:

$$-1.60\times10^{-3} < (\theta gf2p - \theta gf2n)/(vd2p - vd2n) < -1.00\times10^{-3} \quad (1a);$$

$$0.0200 < \Delta\theta gfrn1 < 0.0640 \quad (2a); \text{ and}$$

$$0.14 < Drn1/TD < 0.34 \quad (3a).$$

In each Embodiment, it is further preferred to satisfy one or more of the following conditions (4) to (9) discussed below.

In a further aspect of the zoom lens according to the present invention, a relative partial dispersion of the lens Lrn1 having the smallest Abbe number of the negative lenses forming the rearmost lens unit closest to the image side is defined. It is preferred to satisfy the following conditional expression:

$$0.62 < \theta gfrn1 < 0.70 \quad (4),$$

where $\theta gfrn1$ represents the relative partial dispersion of the lens Lrn1.

When the conditional expression (4) is satisfied, the secondary spectrum of the lateral chromatic aberration may be satisfactorily corrected. When $\theta gfrn1$ exceeds the upper limit of the conditional expression (4), the secondary spectrum of the lateral chromatic aberration is increased too much at the wide angle end. As a result, it becomes difficult to satisfactorily correct the chromatic aberration at the wide angle end. When $\theta gfrn1$ falls below the lower limit of the conditional expression (4), the secondary spectrum of the lateral chromatic aberration becomes overcorrected at the telephoto end. As a result, it becomes difficult to satisfactorily correct the lateral chromatic aberration at the telephoto end.

It is more preferred to set the numerical value range of the conditional expression (4) as follows:

$$0.63 < \theta gfrn1 < 0.68 \quad (4a).$$

In a further aspect of the zoom lens according to the present invention, relative partial dispersions of optical materials used in the first lens unit are defined. The following conditional expression is preferably satisfied:

$$-7.0\times10^{-4} < (\theta gf1p - \theta gf1n)/(v1p - v1n) < -2.0\times10^{-4} \quad (5),$$

where $v1p$ and $\theta gf1p$ respectively represent average values of Abbe numbers and relative partial dispersions of positive lenses forming the first lens unit, and $v1n$ and $\theta gf1n$ respectively represent average values of Abbe numbers and relative partial dispersions of negative lenses.

The conditional expression (5) is defined so as to achieve the correction of the axial chromatic aberration at the telephoto end and high optical performance.

When $(\theta gf1p - \theta gf1n)/(v1p - v1n)$ exceeds the upper limit of the conditional expression (5), the secondary spectrum of the axial chromatic aberration at the telephoto end is advantageously corrected, but refractive indices of positive lenses forming the second lens unit are reduced, with the result that curvature radii of the positive lenses forming the second lens unit become smaller. As a result, a high order aberration of the spherical aberration at the telephoto end is increased, thereby being difficult to achieve good optical performance. When $(\theta gf1p - \theta gf1n)/(v1p - v1n)$ falls below the lower limit of the conditional expression (5), the secondary spectrum of the axial chromatic aberration at the telephoto end is increased. As a result, it becomes difficult to satisfactorily correct chromatic aberrations at the telephoto end. It is more preferred to set the numerical value range of the conditional expression (5) as follows:

$$-6.3\times10^{-4} < (\theta gf1p - \theta gf1n)/(v1p - v1n) < -2.3\times10^{-4} \quad (5a).$$

In a further aspect of the zoom lens according to the present invention, a relationship of the focal length of the first lens unit and a focal length of the second lens unit is defined. It is preferred to satisfy the following conditional expression:

$$-8.50 < f1/f2 < -4.00 \quad (6),$$

where f2 represents the focal length of the second lens unit.

The conditional expression (6) is satisfied to reduce a movement amount of the second lens unit accompanying the zooming while satisfactorily correcting the axial chromatic aberration, and a total lens length is reduced while attaining the increase in magnification. When f1/f2 exceeds the upper limit of the conditional expression (6), the focal length of the second lens unit becomes relatively shorter, which is advantageous in downsizing, but increases aberration variations accompanying the zooming. When f1/f2 falls below the lower limit of the conditional expression (6), the focal length of the second lens unit becomes relatively longer, with the result that the movement amount of the second lens unit during zooming is increased to increase the size of the zoom lens. As a result, it becomes difficult to reduce the size and weight.

It is more preferred to set the numerical value range of the conditional expression (6) as follows:

$$-7.80 < f1/f2 < -4.80 \quad (6a).$$

In a further aspect of the zoom lens according to the present invention, a relationship between a focal length at the telephoto end and a focal length of the first lens unit is defined. It is preferred to satisfy the following conditional expression:

$$2.0 < ft/f1 < 5.5 \quad (7),$$

where ft represents the focal length at the telephoto end.

When the conditional expression (7) is satisfied, the axial chromatic aberration is satisfactorily corrected while attaining a high zoom ratio. When ft/f1 exceeds the upper limit of the conditional expression (7), the entire system of the zoom lens is advantageously downsized, but it becomes difficult to satisfactorily correct optical performance at the telephoto end, in particular, the axial chromatic aberration. When ft/f1 falls below the lower limit of the conditional expression (7), the focal length of the first lens unit is increased. As a result, it becomes difficult to realize the high zoom ratio of 10× or more and the downsizing of the entire system of the zoom lens.

It is more preferred to set the numerical value range of the conditional expression (7) as follows:

$$2.2 < ft/f1 < 5.0 \quad (7a).$$

In a further aspect of the zoom lens according to the present invention, an Abbe number of the lens Lrn1 having the smallest Abbe number of the negative lenses forming the rearmost lens unit closest to the image side is defined, and a condition for using a glass material having a high relative partial dispersion is defined. It is preferred that the Abbe number vdrn1 of the lens Lrn1 satisfy the following conditional expression:

$$14 < vdrn1 < 24 \quad (8).$$

When vdrn1 exceeds the upper limit of the conditional expression (8), the effect of making the secondary spectrum of the lateral chromatic aberration over (positive) at the wide angle end becomes smaller. As a result, the secondary spectrum of the lateral chromatic aberration at the telephoto end becomes overcorrected, thereby being difficult to obtain good image quality over the entire zoom range. To the contrary, when vdrn1 falls below the lower limit of the conditional expression, the secondary spectrum of the lateral chromatic aberration becomes positive and undercorrected at the wide angle end. As a result, it becomes difficult to obtain good image quality over the entire zoom range.

It is more preferred to set the numerical value range of the conditional expression (8) as follows:

$$15 < vdrn1 < 23 \quad (8a).$$

In a further aspect of the zoom lens according to the present invention, the lens Lrn1 having the smallest Abbe number among the negative lenses forming the rearmost lens unit closest to the image side is cemented with one positive lens, and a relationship between relative partial dispersions of the negative lens and the positive lens is defined. It is preferred to satisfy the following conditional expression (9):

$$-8.40 \times 10^{-3} < (\theta gfrp1 - \theta gfrn1)/(vdrp1 - vdrn1) < -3.50 \times 10^{-3} \quad (9),$$

where vdrp1 and θgfrp1 an respectively represent Abbe number and the relative partial dispersion of the positive lens.

When (θgfrp1−θgfrn1)/(vdrp1−vdrn1) exceeds the upper limit of the conditional expression (9), the effect of making the secondary spectrum of the lateral chromatic aberration over (positive) at the wide angle end becomes smaller. As a result, the secondary spectrum of the lateral chromatic aberration becomes overcorrected at the telephoto end, thereby being difficult to obtain good image quality over the entire zoom range. To the contrary, when (θgfrp1−θgfrn1)/(vdrp1−vdrn1) falls below the lower limit of the conditional expression, the secondary spectrum of the lateral chromatic aberration becomes over (positive) and undercorrected at the wide angle end. As a result, it becomes difficult to obtain good image quality over the entire zoom range.

It is more preferred to set the numerical value range of the conditional expression (9) as follows:

$$-8.00 \times 10^{-3} < (\theta gfrp1 - \theta gfrn1)/(vdrp1 - vdrn1) < -3.70 \times 10^{-3} \quad (9a).$$

A specific configuration of the zoom lens of the present invention is described below by way of features of lens configurations of Embodiments 1 to 6 and Numerical Embodiments 1 to 6 corresponding thereto, respectively.

Embodiment 1

Figure 2A:
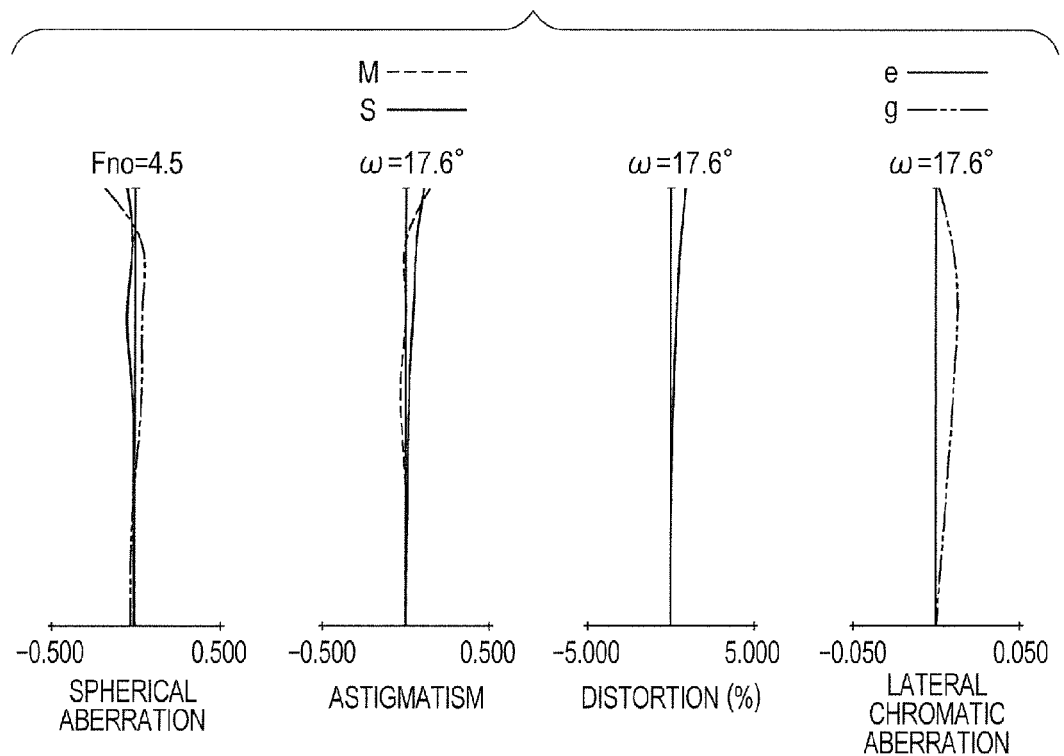
FIG. 2A is a longitudinal aberration diagram when focus is at infinity in a wide angle end state in the zoom lens according to Embodiment 1.
Figure 2B:
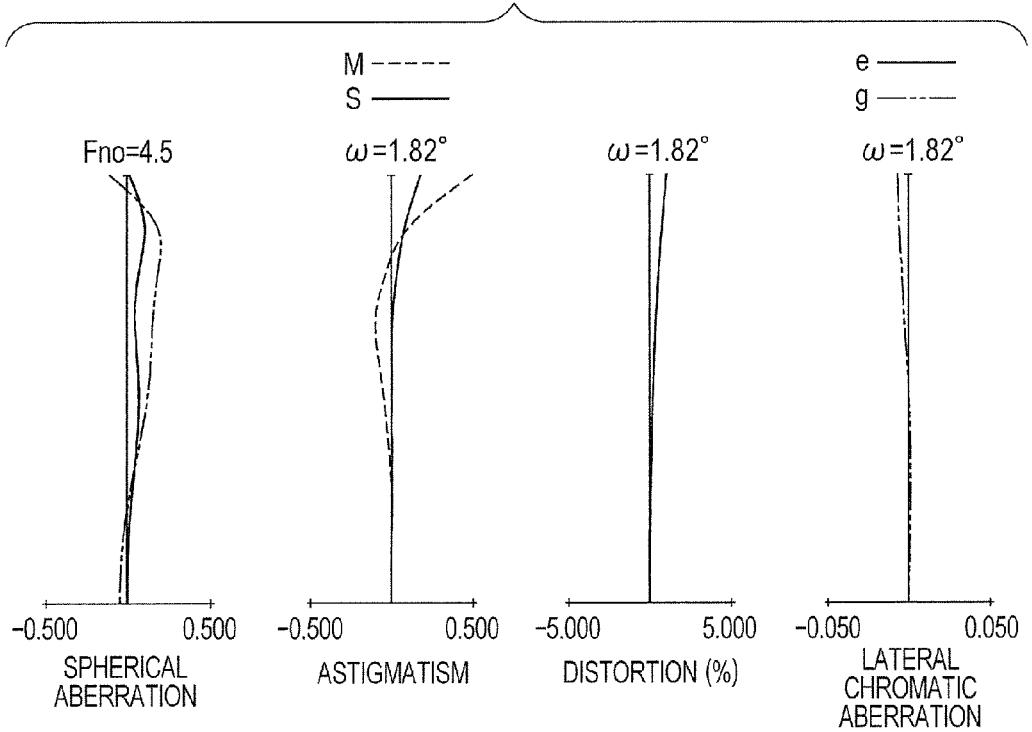
FIG. 2B is a longitudinal aberration diagram when focus is at infinity at a focal length of 500 mm in the zoom lens according to Embodiment 1.
Figure 2C:
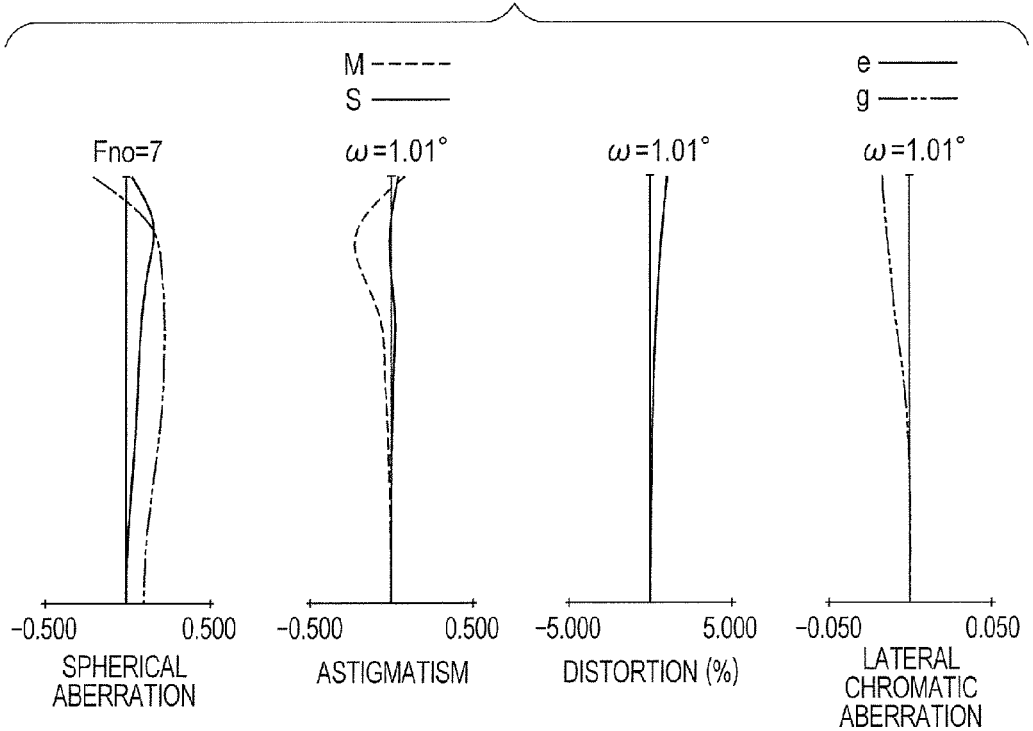
FIG. 2C is a longitudinal aberration diagram when focus is at infinity in a telephoto end state in the zoom lens according to Embodiment 1.

FIG. 1 is a lens cross-sectional view when focus is at an object at infinity at the wide angle end (short focal length end) as Embodiment 1 of the present invention (which corresponds to Numerical Embodiment 1). FIG. 2A, FIG. 2B, and FIG. 2C are respectively aberration diagrams in a state in which focus is at infinity at the wide angle end, a zoom position having a focal length of 500 mm when focus is at infinity, and focus is at infinity at the telephoto end. In lens cross-sectional views, the left side is a subject (object) side (front side), and the right side is the image side (rear side). A first lens unit L1 having a positive refractive power is configured not to move during zooming. The first lens unit L1 includes the following sub units in order from the object side: a sub unit L11 having a positive refractive power, and a sub unit L12 having a positive refractive power. The sub unit L12 having the positive refractive power is moved in the optical axis direction to perform the focus adjustment. A second lens unit L2 having a negative refractive power is configured to move during zooming, and is moved on the optical axis toward the image plane side to perform zooming from the wide angle end to the telephoto end. A third lens unit L3 is configured to move during zooming, and is moved on the optical axis from the wide angle end to the telephoto end. A fixed lens unit L4 is a fourth lens unit (relay lens unit) having a positive refractive power. The fourth lens unit includes the following sub units in order from the object side: a sub unit L41 having a positive refractive power, and a sub unit L42 having a positive refractive power. A fixed aperture stop SP is placed between the sub unit L41 and the sub unit L42. In the fourth lens unit L4, a converter (extender) for converting the focal length or the like may be mounted. An image plane I corresponds to the image pickup plane such as a solid-state image pickup element or a film surface.

In the aberration diagrams, the solid line and the two-dot chain line in the spherical aberration respectively represent an e-line (546.1 nm) and the g-line. The solid line and the one-dot chain line in astigmatism respectively represent a sagittal image plane (ΔS) and a meridional image plane (ΔM), and the two-dot chain line in the lateral chromatic aberration represents the g-line. The astigmatism and the lateral chromatic aberration are illustrated as amounts of aberrations when a ray that passes through a center of a light flux at a stop position is assumed to be a principal ray. A paraxial half angle of view is represented by ω, and an F-number is represented by Fno. In longitudinal aberration diagrams, the spherical aberration, the astigmatism, a distortion, and the lateral chromatic aberration are respectively drawn at scales of 0.5 mm, 0.5 mm, 5%, and 0.05 mm. Note that, in the following embodiments, the terms "wide angle end" and "telephoto end" respectively refer to zoom positions at times when the second lens unit is located at both ends of a range in which the second lens unit is mechanically movable on the optical axis. The above descriptions on the lens cross-sectional views and the aberration diagrams are the same also in the following embodiments unless otherwise specified.

A first lens unit to a fourth lens unit in Embodiment 1 are described. The first lens unit L11 includes the following sub units: the sub unit L11 corresponding to the first lens surface to the eighth lens surface, and the sub unit L12 corresponding to the ninth lens surface to the twelfth lens surface. The sub unit L11 having a positive refractive power includes, in order from the object side, a positive lens, a negative lens, a positive lens, and a negative lens. The sub unit L12 having a positive refractive power includes two positive lenses, and the sub unit L12 is moved in the optical axis direction to perform the focus adjustment. The second lens unit L2 corresponds to the thirteenth lens surface to the twenty-first lens surface, and includes, in order from the object side, a negative lens, a positive cemented lens including a negative lens and a positive lens, a negative lens, and a positive lens. The third lens unit L3 corresponds to the twenty-second lens surface to the twenty-fourth lens surface, and includes a negative cemented lens including a negative lens and a positive lens in order from the object side. The fourth lens unit L4 includes the following sub units: a sub unit L41 corresponding to the twenty-fifth lens surface to the twenty-eighth lens surface, and a sub unit L42 corresponding to the thirtieth lens surface to the forty-fifth lens surface. The sub unit L41 includes two lenses. The sub unit L42 includes, in order from the object side, a negative cemented lens, a positive lens, a negative cemented lens, a positive lens, a positive cemented lens, and a negative cemented lens. Aspherical surfaces are used for the thirteenth surface and the twenty-sixth surface. The aspherical surface as the thirteenth surface corrects a variation in field curvature due to zooming and the variation in spherical aberration on a telephoto side. The aspherical surface as the twenty-sixth surface suppresses the variation in spherical aberration due to zooming and a variation in coma due to the angle of field on a wide angle side.

Values corresponding to the conditional expressions in this embodiment are shown in Table 1. In this embodiment, all of the conditional expressions are satisfied to attain good optical performance. In addition, the zoom lens has a high zoom ratio of 18×, and has a maximum image height, which is determined by a product of the focal length and the half angle of view, of 15.9 mm so as to be compatible with large format sensors.

Embodiment 2

Figure 3:
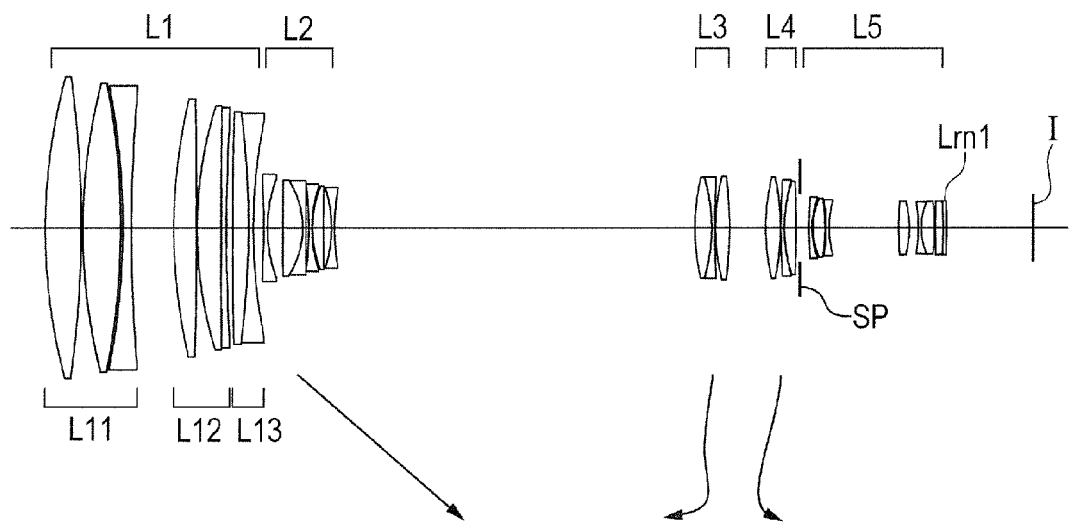
FIG. 3 is a lens cross-sectional view when focus is at infinity at a wide angle end in a zoom lens according to Embodiment 2.
Figure 4A:
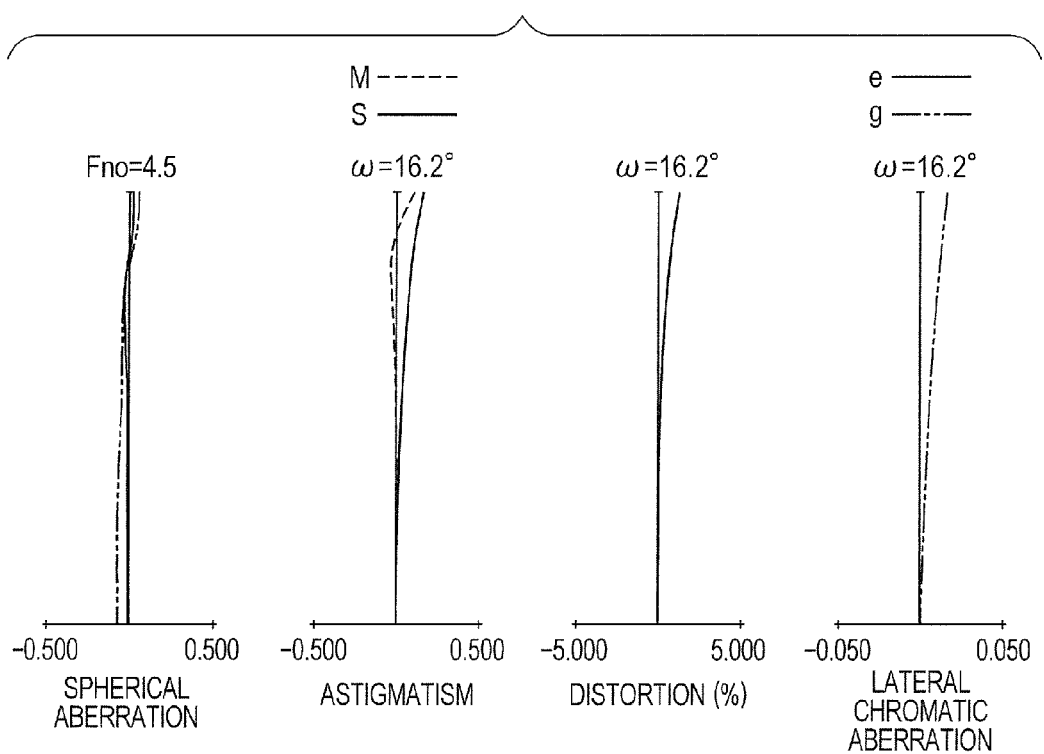
FIG. 4A is a longitudinal aberration diagram when focus is at infinity in a wide angle end state in the zoom lens according to Embodiment 2.
Figure 4B:
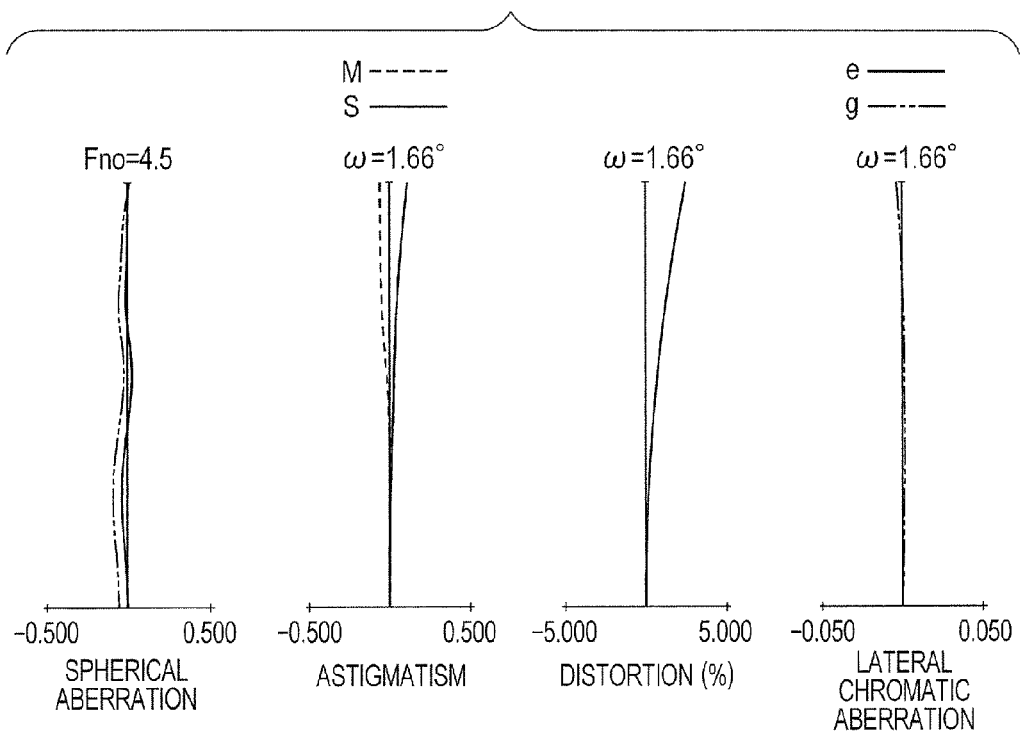
FIG. 4B is a longitudinal aberration diagram when focus is at infinity at a focal length of 500 mm in the zoom lens according to Embodiment 2.
Figure 4C:
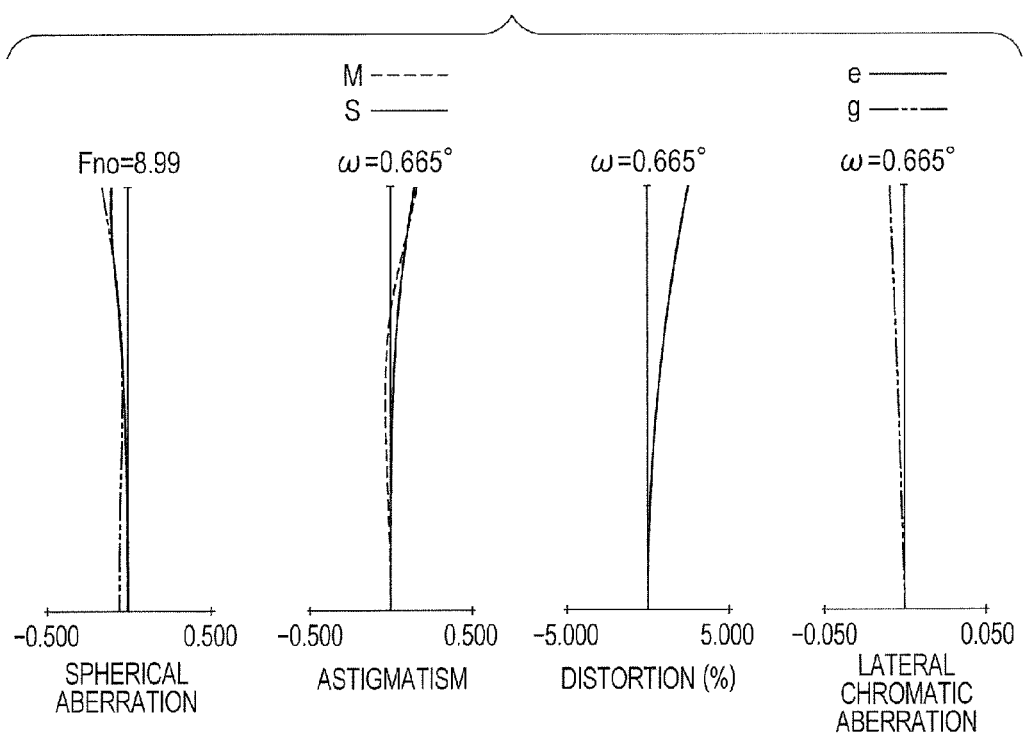
FIG. 4C is a longitudinal aberration diagram when focus is at infinity in a telephoto end state in the zoom lens according to Embodiment 2.

FIG. 3 is a lens cross-sectional view when focus is at an object at infinity at the wide angle end (short focal length end) as Embodiment 2 of the present invention (which corresponds to Numerical Embodiment 2). FIG. 4A, FIG. 4B, and FIG. 4C are respectively aberration diagrams in a state in which focus is at infinity at the wide angle end, a zoom position having a focal length of 500 mm when focus is at infinity, and focus is at infinity at the telephoto end.

A first lens unit to a fifth lens unit in Embodiment 2 are described. The first lens unit L1 is configured not to move during zooming, and includes sub units L11, L12, and L13 respectively corresponding to the first lens surface to the sixth lens surface, the seventh lens surface to the eleventh lens surface, and the twelfth lens surface to the fourteenth lens surface. The sub unit L11 having a positive refractive power includes, in order from the object side, two positive lenses and a negative lens. The sub unit L12 having a positive refractive power includes a positive lens and a cemented lens including a positive lens and a negative lens, and the sub unit L12 is moved in the optical axis direction to perform focus adjustment. The sub unit L13 having a negative refractive power includes a cemented lens including a positive lens and a negative lens. The second lens unit L2 corresponds to the fifteenth lens surface to the twenty-fifth lens surface, and includes, in order from the object side, a negative lens, a positive cemented lens including a positive lens and a negative lens, a negative lens, a positive lens, and a negative lens. The third lens unit L3 corresponds to the twenty-sixth lens surface to the thirty-first lens surface, and includes, in order from the object side, a positive lens, a negative lens, and a positive lens. The fourth lens unit L4 corresponds to the thirty-second lens surface to the thirty-seventh lens surface, and includes, in order from the object side, a positive lens, and a cemented lens including a negative lens and a positive lens. The respective lens units L2, L3, and L4 are moved in the optical axis direction to perform zooming. The fifth lens unit L5 is a fixed unit, corresponds to the thirty-eighth lens surface to the fifty-second lens surface, and includes, in order from the object side, a negative lens, a positive lens, a negative lens, a positive lens, and two cemented lenses. Aspherical surfaces are used for the fifteenth surface, the twenty-ninth surface, and the thirty-second surface, and suppress a variation in spherical aberration due to zooming and the variation in coma due to the angle of field on a wide angle side.

Values corresponding to the conditional expressions in this embodiment are shown in Table 1. In this numerical embodiment, all of the conditional expressions are satisfied to attain good optical performance. In addition, the zoom lens has a high zoom ratio of 25×, and has a maximum image height, which is determined by a product of the focal length and the half angle of view, of 14.50 mm so as to be compatible with large format sensors.

Embodiment 3

Figure 5:
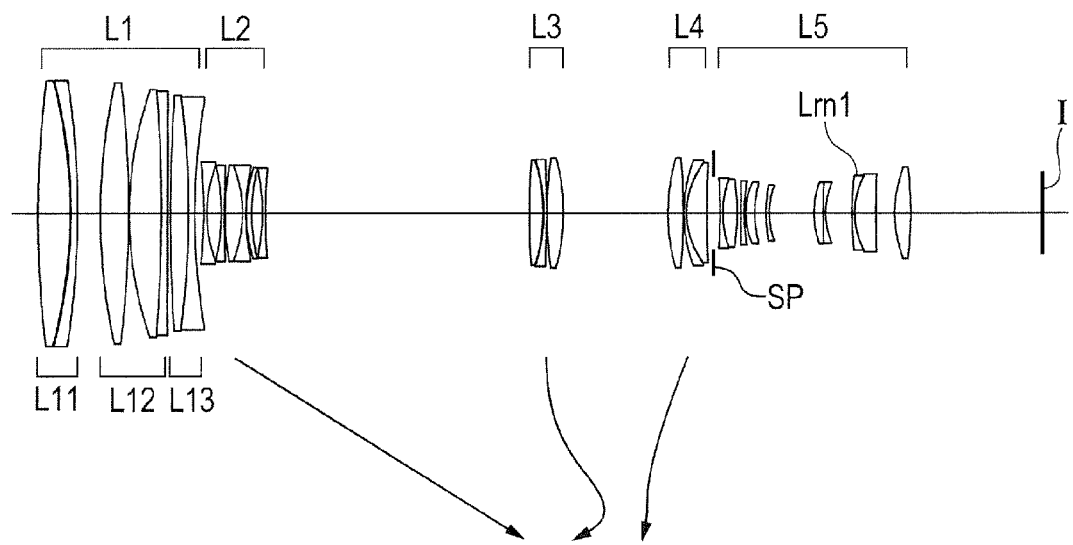
FIG. 5 is a lens cross-sectional view when focus is at infinity at a wide angle end in a zoom lens according to Embodiment 3.
Figure 6A:
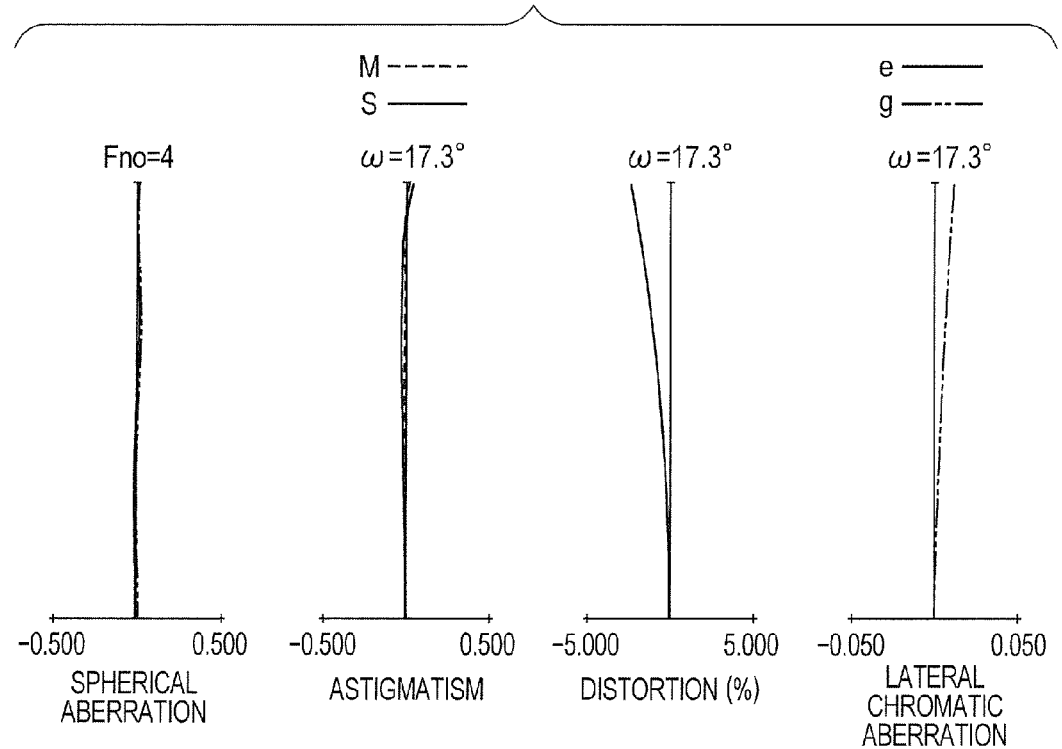
FIG. 6A is a longitudinal aberration diagram when focus is at infinity in a wide angle end state in the zoom lens according to Embodiment 3.
Figure 6B:
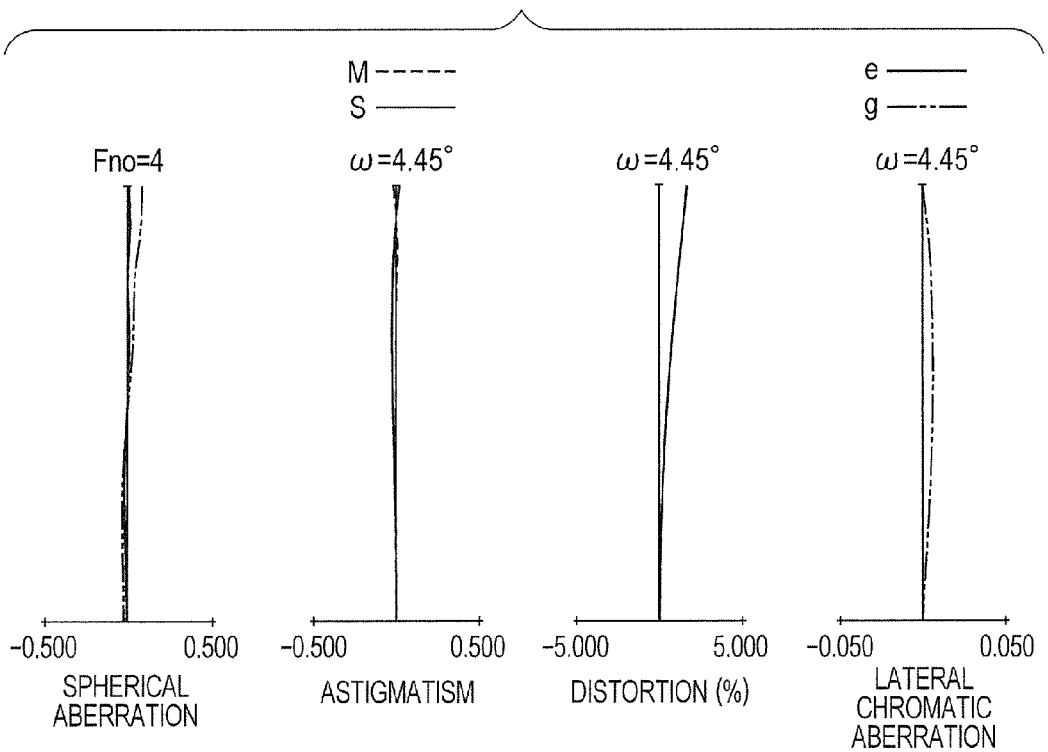
FIG. 6B is a longitudinal aberration diagram when focus is at infinity at a focal length of 200 mm in the zoom lens according to Embodiment 3.
Figure 6C:
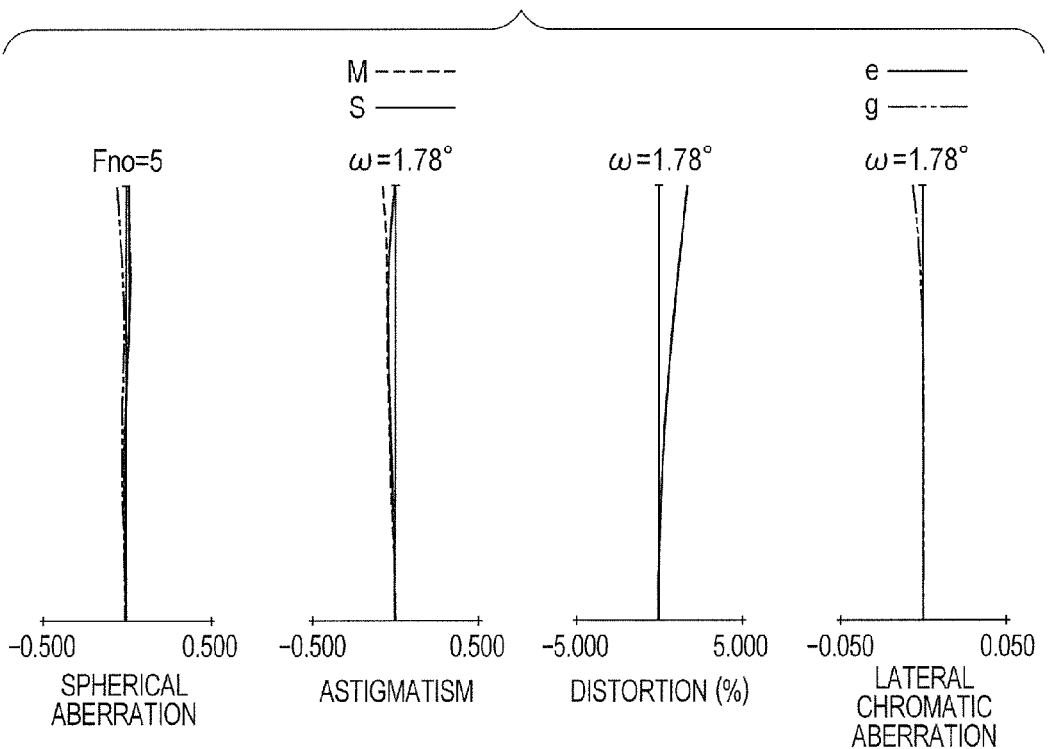
FIG. 6C is a longitudinal aberration diagram when focus is at infinity in a telephoto end state in the zoom lens according to Embodiment 3.

FIG. 5 is a lens cross-sectional view when focus is at an object at infinity at the wide angle end (short focal length end) as Embodiment 3 of the zoom lens according to the present invention (which corresponds to Numerical Embodiment 3). FIG. 6A, FIG. 6B, and FIG. 6C are respectively aberration diagrams in a state in which focus is at infinity at the wide angle end, a zoom position having a focal length of 200 mm, and the telephoto end.

A first lens unit to a fifth lens unit in Embodiment 3 are described. The first lens unit L1 is configured not to move during zooming, and includes sub units L11, L12, and L13 respectively corresponding to the first lens surface to the fourth lens surface, the fifth lens surface to the ninth lens surface, and the tenth lens surface to the twelfth lens. The sub unit L11 having a positive refractive power includes, in order from the object side, a positive lens and a negative lens. The sub unit L12 having a positive refractive power includes a positive lens and a cemented lens including a positive lens and a negative lens, and the sub unit L12 is moved in an optical axis direction to perform focus adjustment. The sub unit L13 having a negative refractive power includes a cemented lens including a positive lens and a negative lens. The second lens unit L2 corresponds to the thirteenth lens surface to the twenty-third lens surface, and includes, in order from the object side, two negative lenses, a positive cemented lens including a positive lens and a negative lens, a positive lens, and a negative lens. The third lens unit L3 corresponds to the twenty-fourth lens surface to the twenty-ninth lens surface, and includes, in order from the object side, a positive lens, a negative lens, and a positive lens. The fourth lens unit L4 corresponds to the thirtieth lens surface to the thirty-fourth lens surface, and includes, in order from the object side, a positive lens, and a cemented lens including a negative lens and a positive lens. The respective lens units L2, L3, and L4 are moved in the optical axis direction to perform zooming. The fifth lens unit L5 is a fixed unit, corresponds to the thirty-fifth lens surface to the fifty-second lens surface, and includes, in order from the object side, a cemented lens including a negative lens and a positive lens, a negative lens, a positive lens, a negative lens, a negative cemented lens, a positive cemented lens, and a positive lens. An aspherical surface is used for the twenty-seventh surface, and suppresses a variation in spherical aberration due to zooming, and the variation in coma due to the angle of field on a wide angle side.

Values corresponding to the conditional expressions in this embodiment are shown in Table 1. In this numerical embodiment, all of the conditional expressions are satisfied to attain good optical performance. In addition, the zoom lens has a high zoom ratio of 10×, and has a maximum image height, which is determined by a product of the focal length and the half angle of view, of 15.55 mm so as to be compatible with large format sensors.

Embodiment 4

Figure 7:
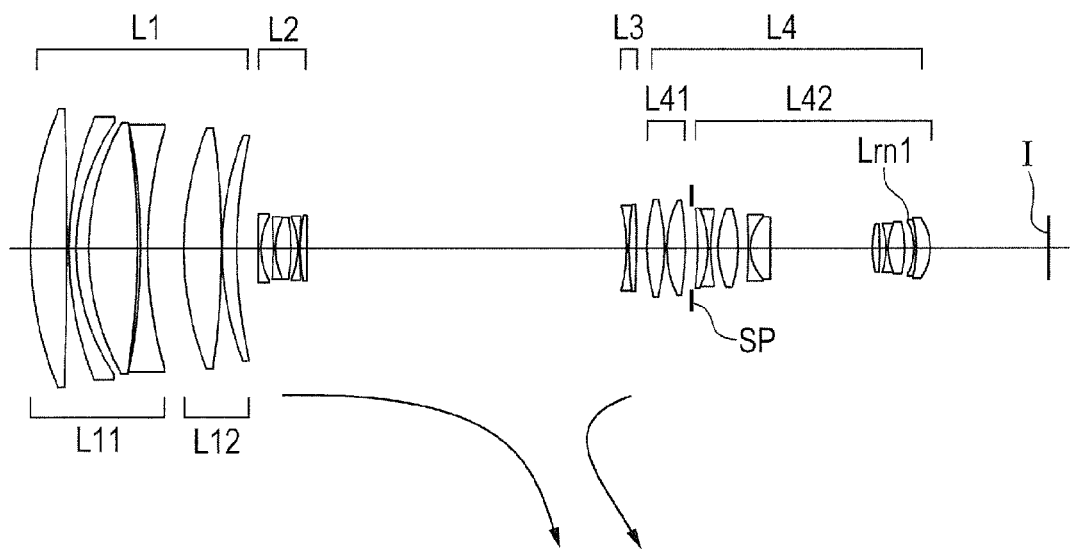
FIG. 7 is a lens cross-sectional view when focus is at infinity at a wide angle end in a zoom lens according to Embodiment 4.
Figure 8A:
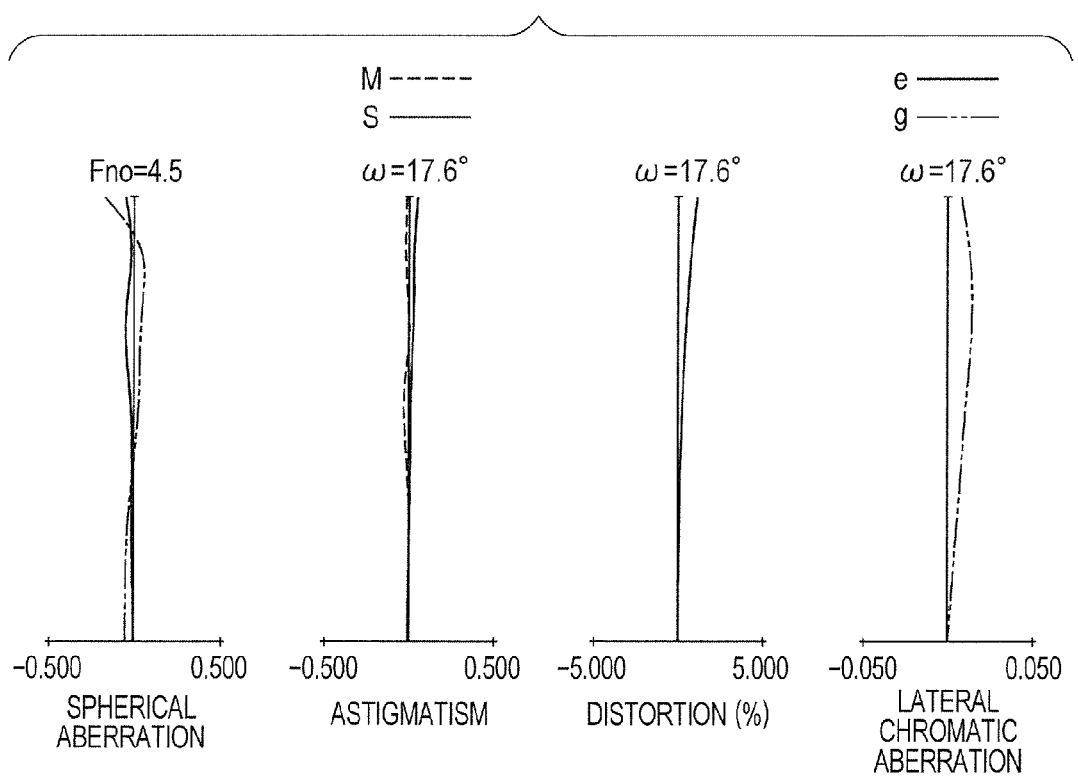
FIG. 8A is a longitudinal aberration diagram when focus is at infinity in a wide angle end state in the zoom lens according to Embodiment 4.
Figure 8B:
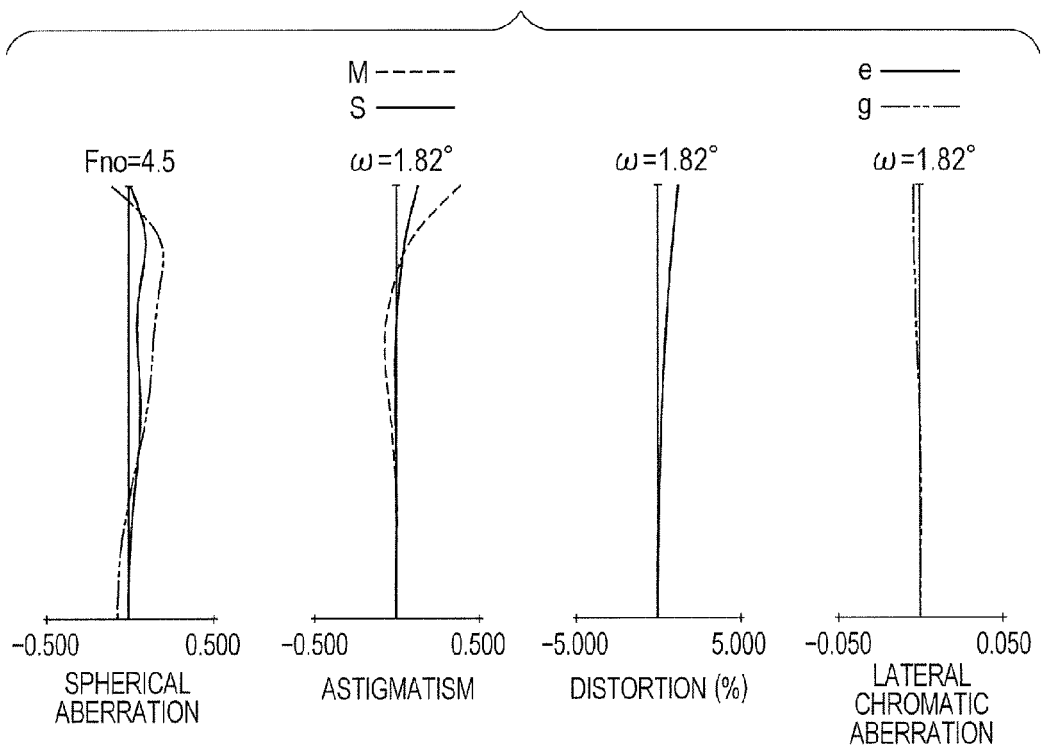
FIG. 8B is a longitudinal aberration diagram when focus is at infinity at a focal length of 500 mm in the zoom lens according to Embodiment 4.
Figure 8C:
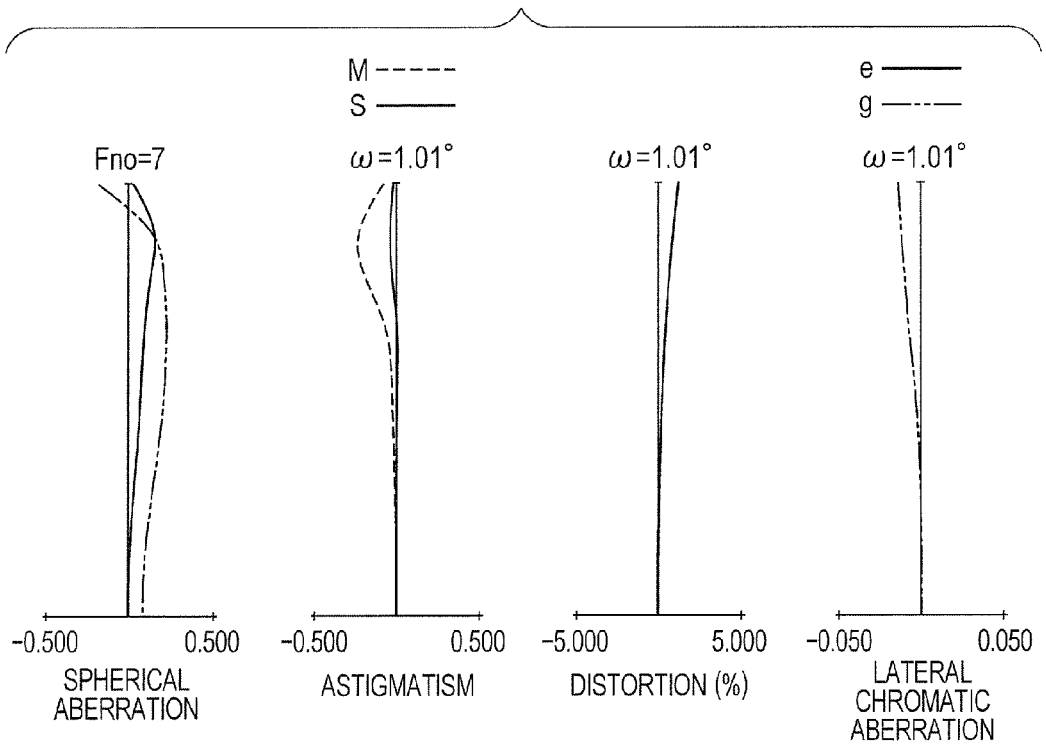
FIG. 8C is a longitudinal aberration diagram when focus is at infinity in a telephoto end state in the zoom lens according to Embodiment 4.

FIG. 7 is a lens cross-sectional view when focus is at an object at infinity at the wide angle end (short focal length end) as Embodiment 4 of the zoom lens according to the present invention (which corresponds to Numerical Embodiment 4). FIG. 8A, FIG. 8B, and FIG. 8C are respectively aberration diagrams in a state in which focus is at infinity at the wide angle end, a zoom position having a focal length of 500 mm, and the telephoto end.

A first lens unit to a fourth lens unit in Embodiment 4 are described. The first lens unit L1 is configured not to move during zooming, and includes sub units L11 and L12 respectively corresponding to the first lens surface to the eighth lens surface and the ninth lens surface to the twelfth lens surface. The sub unit L11 having a positive refractive power includes, in order from the object side, a positive lens, a negative lens, a positive lens, and a negative lens. The sub unit L12 having a positive refractive power includes two positive lenses, and the sub unit L12 is moved in an optical axis direction to perform focus adjustment. The second lens unit L2 corresponds to the thirteenth lens surface to the twenty-first lens surface, and includes, in order from the object side, a negative lens, a positive cemented lens including a negative lens and a positive lens, a negative lens, and a positive lens. The third lens unit L3 corresponds to the twenty-second lens surface to the twenty-fourth lens surface, and includes a negative cemented lens including, in order from the object side, a negative lens and a positive lens. The respective lens units L2 and L3 are moved in the optical axis direction to perform zooming. The fourth lens unit L4 is a fixed unit, and includes sub units L41 and L42 respectively corresponding to the twenty-fifth lens surface to the twenty-eighth lens surface and the thirtieth lens surface to the forty-fifth lens surface. The sub unit L41 includes two lenses. The sub unit L42 includes, in order from the object side, a negative cemented lens, a positive lens, a negative cemented lens, a positive lens, a positive cemented lens, and a negative cemented lens. Aspherical surfaces are used for the thirteenth surface and the twenty-sixth surface. The aspherical surface as the thirteenth surface corrects the variation in curvature of field due to zooming and the variation in spherical aberration on a telephoto side. The aspherical surface as the twenty-sixth surface suppresses the variation in spherical aberration due to zooming and the variation in coma due to the angle of field on the wide angle side.

Embodiment 5

Figure 9:
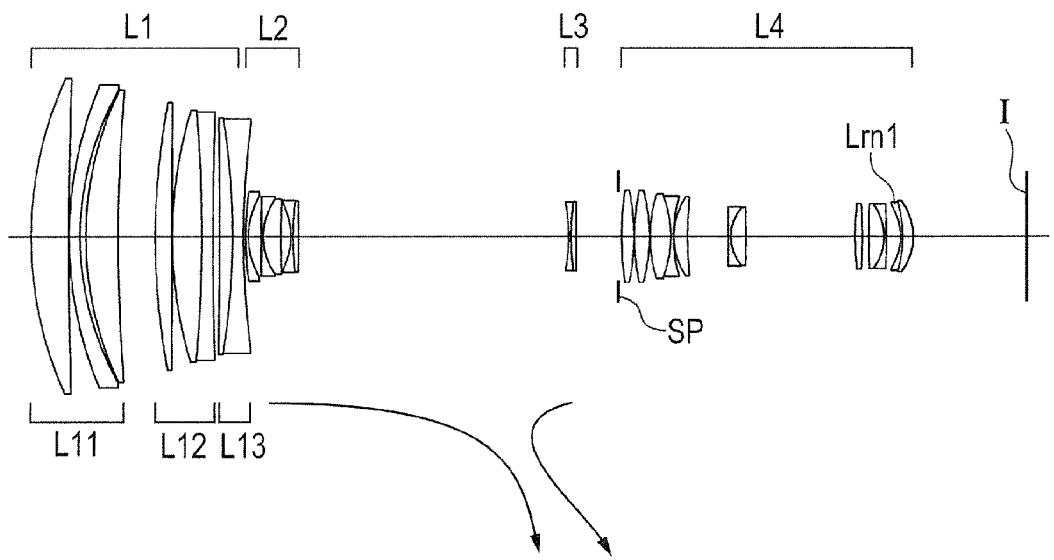
FIG. 9 is a lens cross-sectional view when focus is at infinity at a wide angle end in a zoom lens according to Embodiment 5.
Figure 10A:
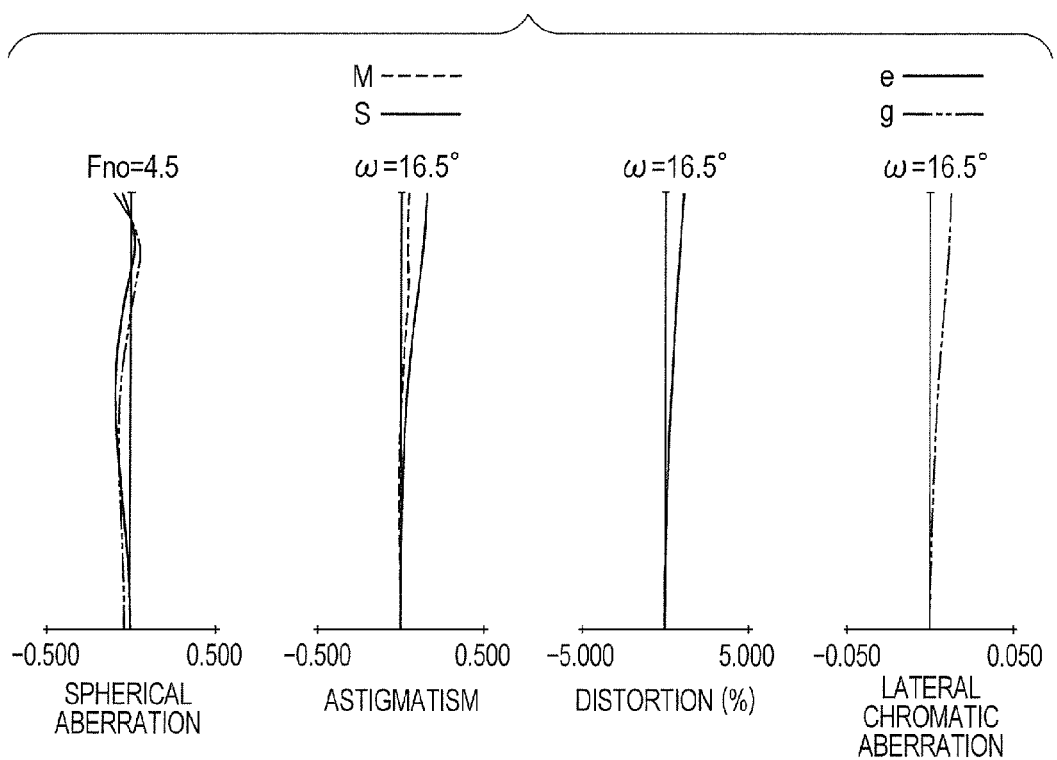
FIG. 10A is a longitudinal aberration diagram when focus is at infinity in a wide angle end state in the zoom lens according to Embodiment 5.
Figure 10B:
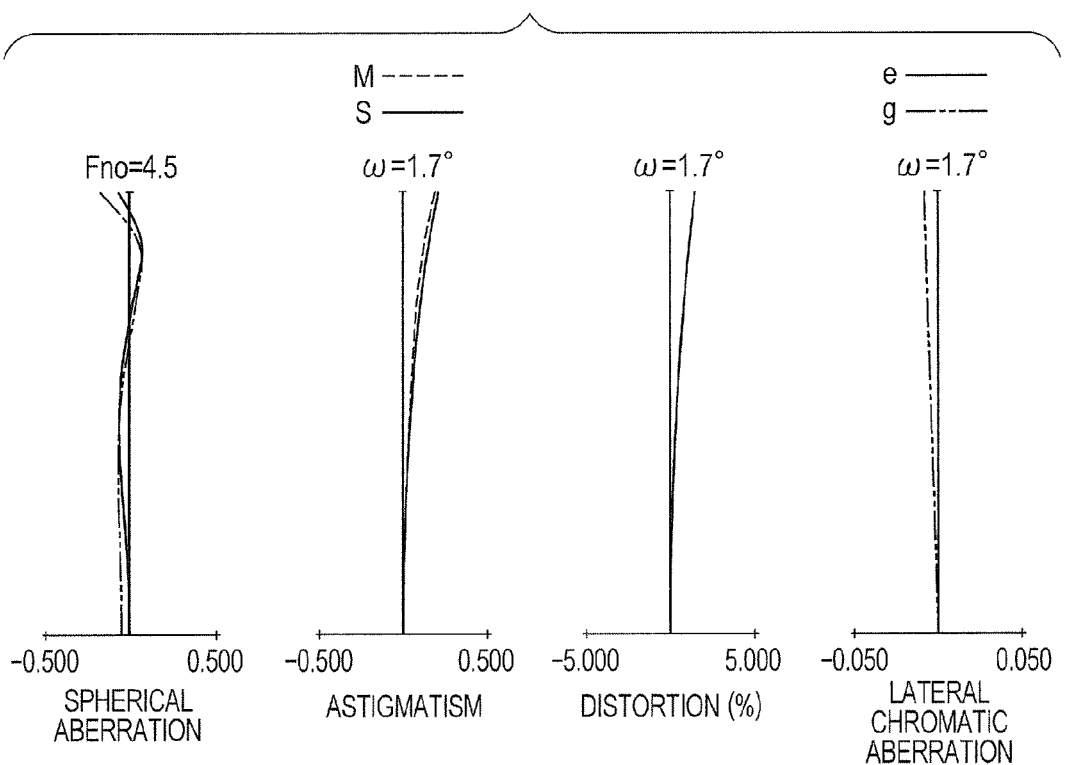
FIG. 10B is a longitudinal aberration diagram when focus is at infinity at a focal length of 500 mm in the zoom lens according to Embodiment 5.
Figure 10C:
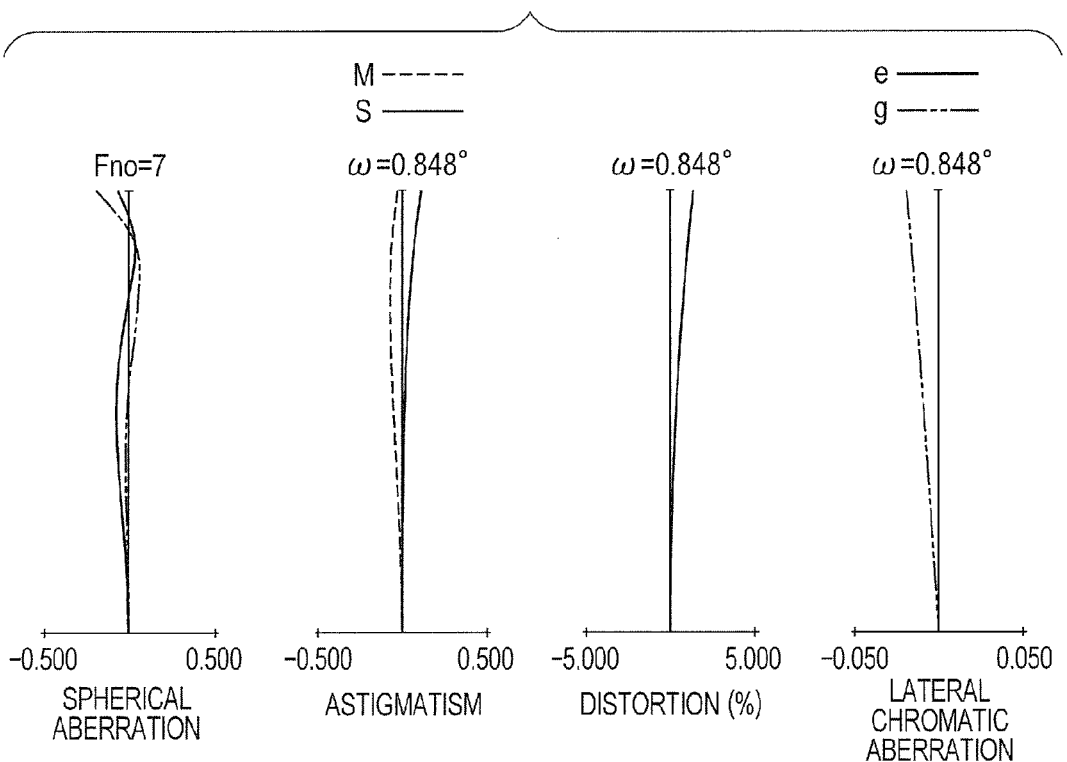
FIG. 10C is a longitudinal aberration diagram when focus is at infinity in a telephoto end state in the zoom lens according to Embodiment 5.

FIG. 9 is a lens cross-sectional view when focus is at an object at infinity at the wide angle end (short focal length end) as Embodiment 5 of the zoom lens according to the present invention (which corresponds to Numerical Embodiment 5). FIG. 10A, FIG. 10B, and FIG. 10C are respectively aberration diagrams in a state in which focus is at infinity at the wide angle end, a zoom position having a focal length of 500 mm, and the telephoto end.

A first lens unit to a fourth lens unit in Embodiment 5 are described. The first lens unit L1 is configured not to move during zooming, and includes sub units L11, L12, and L13 respectively corresponding to the first lens surface to the sixth lens surface, the seventh lens surface to the eleventh lens surface, and the twelfth lens surface to the fourteenth lens surface. The sub unit L11 having a positive refractive power includes, in order from the object side, a positive lens, a negative lens, and a positive lens. The sub unit L12 having a positive refractive power includes a positive lens and a cemented lens including a positive lens and a negative lens. The sub unit L13 having a negative refractive power includes a cemented lens including a positive lens and a negative lens. The sub unit L13 is moved in an optical axis direction to perform focus adjustment. The second lens unit L2 corresponds to the fifteenth lens surface to the twenty-second lens surface, and includes, in order from the object side, a negative lens, a cemented lens including a negative lens and a positive lens, and a cemented lens including a negative lens and a positive lens. The third lens unit L3 corresponds to the twenty-third lens surface to the thirty-fifth lens surface, and includes a negative cemented lens including, in order from the object side, a negative lens and a positive lens. The respective lens units L2 and L3 are moved in the optical axis direction to perform zooming. The fourth lens unit L4 is a fixed unit, and corresponds to the twenty-seventh lens surface to the forty-sixth lens surface. The fourth lens unit L4 includes, in order from the object side, two positive lenses, a cemented lens, a positive lens, a cemented lens, a positive lens, and two cemented lenses. An aspherical surface is used for the fifteenth surface. The aspherical surface as the fifteenth surface corrects the variation in curvature of field due to zooming and the variation in spherical aberration on a telephoto side.

Values corresponding to the conditional expressions in this embodiment are shown in Table 1. In this numerical embodiment, all of the conditional expressions are satisfied to attain good optical performance. In addition, the zoom lens has a high zoom ratio of 20×, and has a maximum image height, which is determined by a product of the focal length and the half angle of view, of 14.8 mm so as to be compatible with large format sensors.

Embodiment 6

Figure 11:
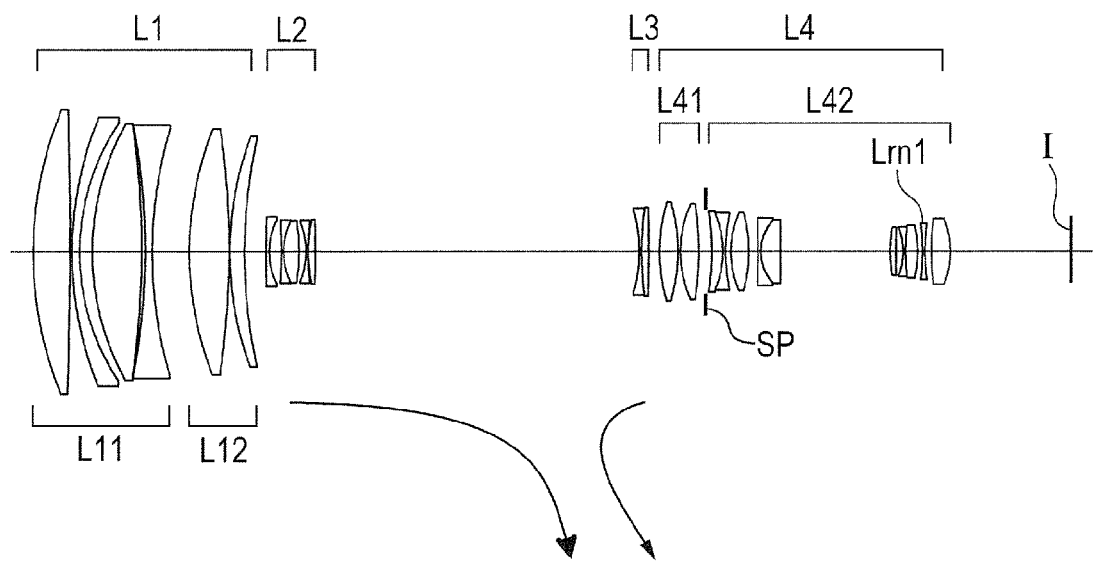
FIG. 11 is a lens cross-sectional view when focus is at infinity at a wide angle end in a zoom lens according to Embodiment 6.
Figure 12A:
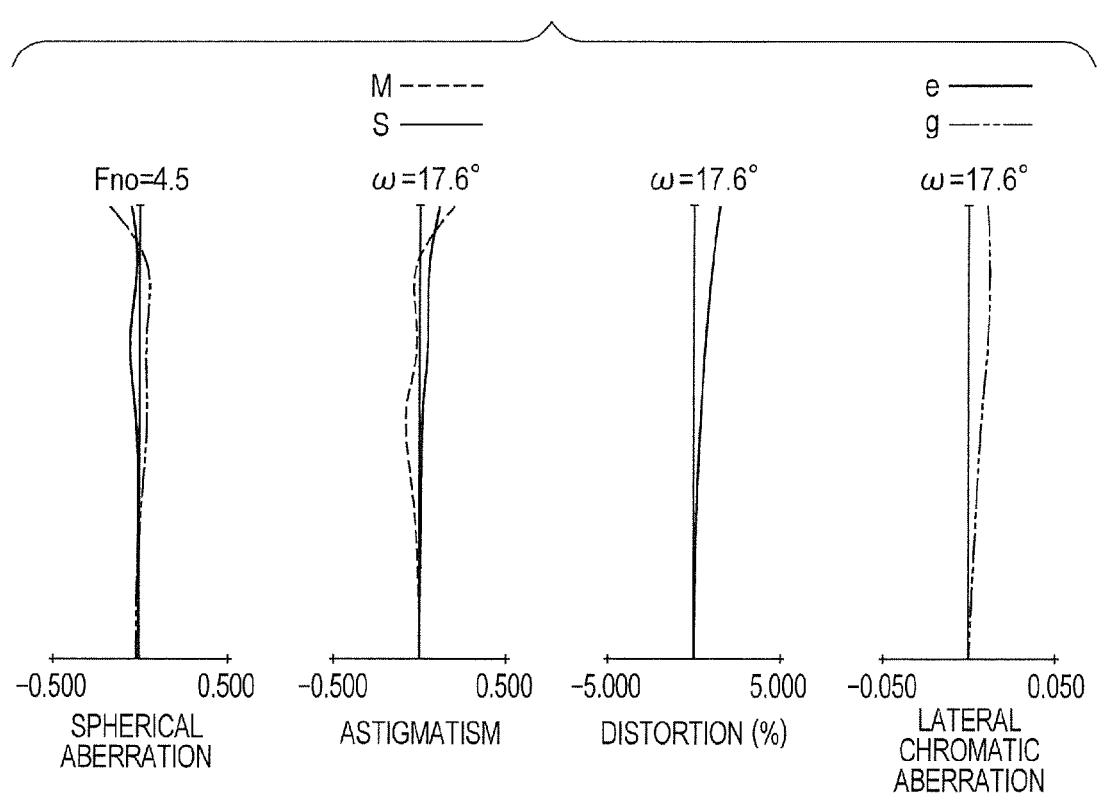
FIG. 12A is a longitudinal aberration diagram when focus is at infinity in a wide angle end state in the zoom lens according to Embodiment 6.
Figure 12B:
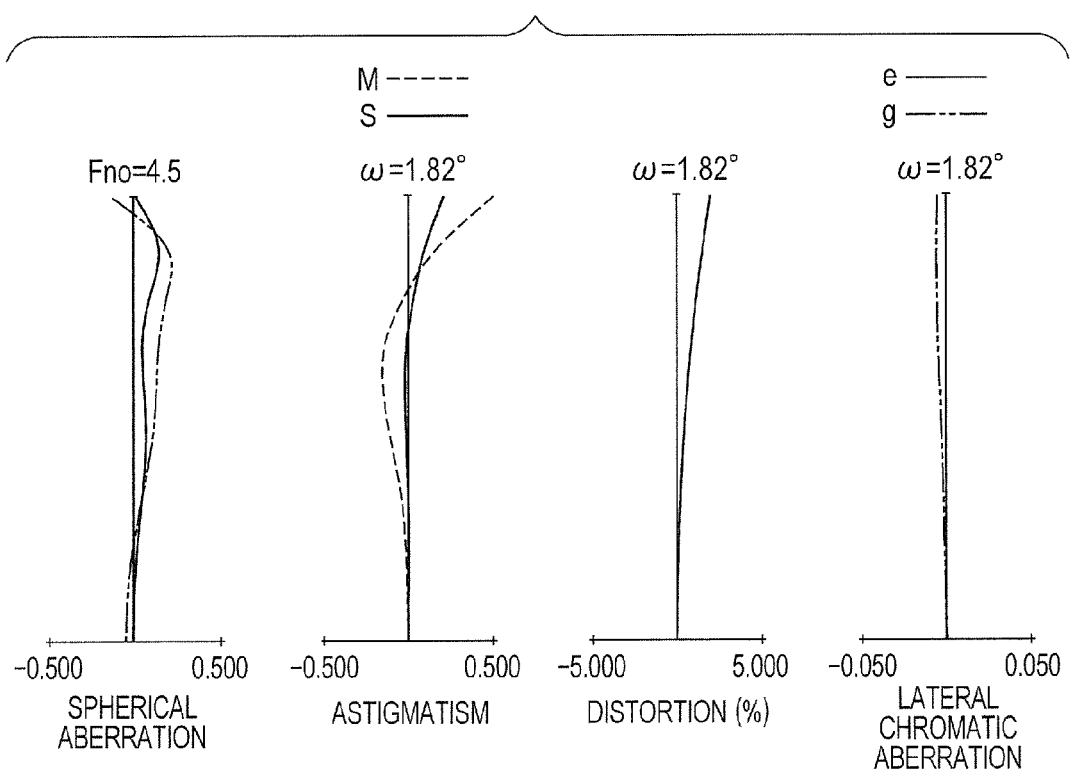
FIG. 12B is a longitudinal aberration diagram when focus is at infinity at a focal length of 500 mm in the zoom lens according to Embodiment 6.
Figure 12C:
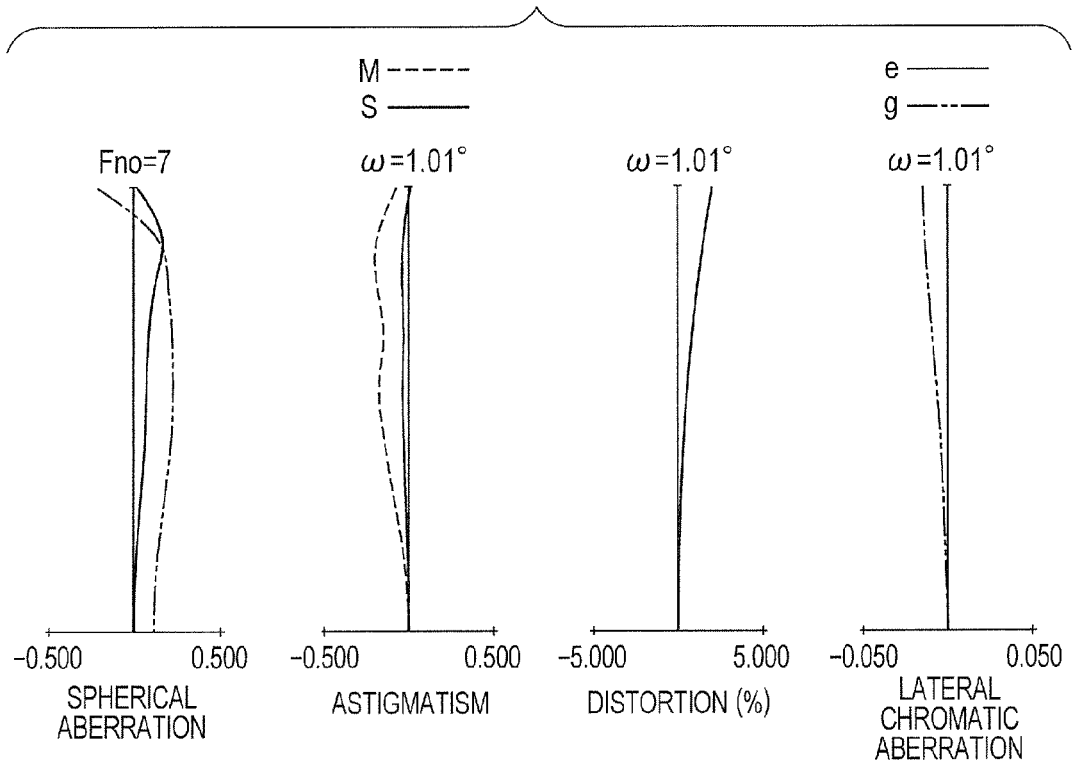
FIG. 12C is a longitudinal aberration diagram when focus is at infinity in a telephoto end state in the zoom lens according to Embodiment 6.

FIG. 11 is a lens cross-sectional view when focus is at an object at infinity at the wide angle end (short focal length end) as Embodiment 6 of the zoom lens according to the present invention which corresponds to Numerical Embodiment 6). FIG. 12A, FIG. 12B, and FIG. 12C are respectively aberration diagrams in a state in which focus is at infinity at the wide angle end, a zoom position having a focal length of 500 mm, and the telephoto end.

A first lens unit to a fourth lens unit in Embodiment 6 are described. The first lens unit L1 is configured not to move during zooming, and includes sub units L11 and L12 respectively corresponding to the first lens surface to the eighth lens surface and the ninth lens surface to the twelfth lens surface. The sub unit L11 having a positive refractive power includes, in order from the object side, a positive lens, a negative lens, a positive lens, and a negative lens. The sub unit L12 having a positive refractive power includes two positive lenses, and the sub unit L12 is moved in an optical axis direction to perform focus adjustment. The second lens unit L2 corresponds to the thirteenth lens surface to the twenty-first lens surface, and includes, in order from the object side, a negative lens, a positive cemented lens including a negative lens and a positive lens, a negative lens, and a positive lens. The third lens unit L3 corresponds to the twenty-second lens surface to the twenty-fourth lens surface, and includes a negative cemented lens including, in order from the object side, a negative lens and a positive lens. The respective lens units L2 and L3 are moved in the optical axis direction to perform zooming. The fourth lens unit L4 is a fixed unit, and includes sub units L41 and L42 respectively corresponding to the twenty-fifth lens surface to the twenty-eighth lens surface and the thirtieth lens surface to the forty-sixth lens surface. The sub unit L41 includes two lenses. The sub unit L42 includes, in order from the object side, a negative cemented lens, a positive lens, a negative cemented lens, a positive lens, a positive cemented lens, a negative lens, and a positive lens. Aspherical surfaces are used for the thirteenth surface and the twenty-sixth surface. The aspherical surface as the thirteenth surface corrects the variation in curvature of field due to zooming and the variation in spherical aberration on a telephoto side. The aspherical surface as the twenty-sixth surface suppresses the variation in spherical aberration due to zooming and the variation in coma due to the angle of field on the wide angle side.

Values corresponding to the conditional expressions in this embodiment are shown in Table 1. In this numerical embodiment, all of the conditional expressions are satisfied to attain good optical performance. In addition, the zoom lens has a high zoom ratio of 18×, and has a maximum image height, which is determined by a product of the focal length and the half angle of view, of 15.9 mm so as to be compatible with large format sensors.

Figure 13:
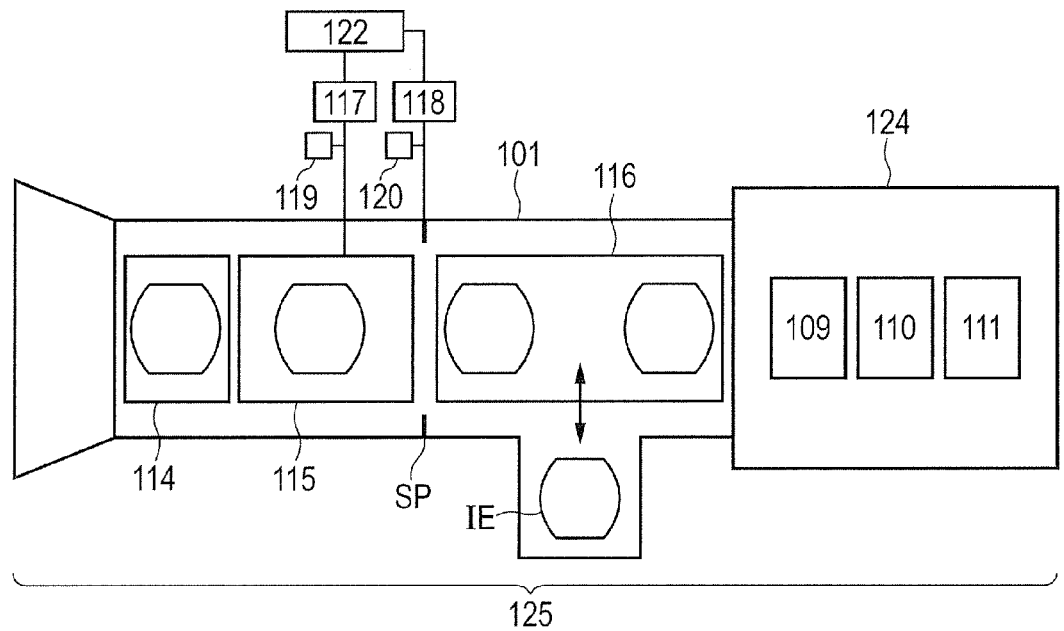
FIG. 13 is a schematic diagram of a main part of an image pickup apparatus according to the present invention.

Next, an image pickup apparatus using each zoom lens described above as an image pickup optical system is described. FIG. 13 is a schematic diagram of a main part of an image pickup apparatus (television camera system) using the zoom lens according to each embodiment as an image pickup optical system. In FIG. 13, a zoom lens 101 is any one of the zoom lenses according to Embodiments 1 to 6.

The zoom lens 101 may be detachably mounted on a camera 124, to thereby construct an image pickup apparatus 125. The zoom lens 101 includes a first lens unit 114, a zoom portion 115 configured to move during zooming, and a lens unit 116 for imaging. Further, the zoom lens 101 includes an aperture stop SP. The lens unit 116 configured not to move for zooming includes a zoom optical system IE, which is retractably insertable in an optical path.

The zoom portion 115 includes a drive mechanism for being driven in the optical axis direction. Drive units 117 and 118 such as motors electrically drive respectively the zoom portion 115 and the aperture stop SP. Note that, the drive mechanism may be added to move all of the lens units 114, 115, and 116 or a part of each lens unit in the optical axis direction for focusing. Detectors 119 and 120 such as an encoder, a potentiometer, or a photosensor detect positions of the lens units in the zoom portion 115 on the optical axis and a stop diameter of the aperture stop SP. Note that, drive loci of the lens units in the zoom portion 115 may be mechanical loci by a helicoid, a cam, or the like, or electric loci by an ultrasonic motor or the like. The camera 124 includes a glass block 109, which is equivalent to an optical filter or a color separation prism in the camera 124. Further, the camera 124 includes a solid-state image pickup element (photoelectrical transducer) 110, such as a CCD sensor or a CMOS sensor that receives an object image formed by the zoom lens 101. Further, CPUs 111 and 122 respectively control the driving of the camera 124 and the zoom lens main body 101. By applying the zoom lens according to the present invention to a television camera as described above, an image pickup apparatus having high optical performance may be implemented.

The embodiments of the present invention are described above, but the present invention is not limited to these embodiments and can be modified and changed in various ways.

Next, Numerical Embodiments 1 to 6 corresponding to Embodiments 1 to 6 of the present invention are shown below. In each of the numerical embodiments, symbol "i" represents the order of a surface from the object side, symbol "ri" represents a curvature radius of an i-th surface from the object side, symbol "di" represents an interval between the i-th surface and an (i+1)th surface from the object side, and symbols "ndi", "vdi", and "θgfi" respectively represent a refractive index, an Abbe number, and a relative partial dispersion of an optical material between the i-th surface and the (i+1)th surface. The focal length, the F-number (aperture), and the angle of field represent values when focus is at an object at infinity. Symbol BF is an air conversion value of a distance from the final surface of the lens to the image plane. A lens suffixed with "*Lrn1" is the lens corresponding to Lrn1.

Note that, the aspherical shape is expressed by the following expression:

$$X=(y^2/R)/\{1+(1-k\times y^2/R^2)^{0.5}\}+A4\times y^4+A6\times y^6+A8\times y^8+A10\times y^{10}+A12\times y^{12}$$

where x represents a coordinate in the optical axis direction, y represents a coordinate in a direction perpendicular to the optical axis, R represents a standard curvature radius, k represents a conic constant, and An represents an n-th order aspherical coefficient, provided that "e-x" means "×10$^{-x}$". Note that, the lens surfaces having the aspherical surfaces are marked with asterisks (*) on the right side of surface numbers in the tables.

The correspondence between each of the embodiments and each of the above-mentioned conditional expressions is shown in Table 1.

Numerical Embodiment 1

| | | Unit mm | | | | | |
|---|---|---|---|---|---|---|---|
| Surface number | r | d | nd | vd | θgF | Effective diameter | Focal length |
| 1 | 167.44394 | 16.69659 | 1.487490 | 70.23 | 0.5300 | 128.571 | 320.606 |
| 2 | −2,391.56563 | 1.00000 | 1.000000 | | | 127.764 | |
| 3 | 161.47873 | 3.40000 | 1.729157 | 54.68 | 0.5444 | 121.809 | −416.496 |

-continued

| | | | | | | | | |
|---|---|---|---|---|---|---|---|---|
| 4 | 104.64242 | 5.81162 | 1.000000 | | | 116.411 | | |
| 5 | 117.88967 | 22.62538 | 1.433870 | 95.10 | 0.5373 | 116.095 | 211.164 | |
| 6 | −391.60210 | 1.50010 | 1.000000 | | | 114.868 | | |
| 7 | −307.05654 | 3.20000 | 1.729157 | 54.68 | 0.5444 | 114.617 | −164.445 | |
| 8 | 199.01437 | 16.83102 | 1.000000 | | | 110.818 | | |
| 9 | 150.78054 | 17.56513 | 1.433870 | 95.10 | 0.5373 | 111.229 | 253.429 | |
| 10 | −395.42141 | 0.20000 | 1.000000 | | | 110.550 | | |
| 11 | 152.54264 | 7.27275 | 1.433870 | 95.10 | 0.5373 | 104.480 | 868.100 | |
| 12 | 252.24170 | (Variable) | 1.000000 | | | 102.692 | | |
| 13* | 2,295.64046 | 1.20000 | 1.772499 | 49.60 | 0.5521 | 31.745 | −38.698 | |
| 14 | 29.64296 | 5.83845 | 1.000000 | | | 28.906 | | |
| 15 | −187.25197 | 1.00000 | 1.618000 | 63.33 | 0.5441 | 28.566 | −43.751 | |
| 16 | 31.80543 | 7.19712 | 1.720467 | 34.70 | 0.5834 | 28.192 | 32.556 | |
| 17 | −82.98689 | 3.15416 | 1.000000 | | | 28.138 | | |
| 18 | −36.10603 | 1.00000 | 1.618000 | 63.33 | 0.5441 | 28.021 | −51.061 | |
| 19 | 260.78998 | 0.20000 | 1.000000 | | | 29.165 | | |
| 20 | 76.99555 | 3.35446 | 1.548141 | 45.79 | 0.5685 | 29.818 | 132.454 | |
| 21 | −1,377.60223 | (Variable) | 1.000000 | | | 30.144 | | |
| 22 | −71.78747 | 1.00000 | 1.729157 | 54.68 | 0.5444 | 37.780 | −68.259 | |
| 23 | 165.58726 | 3.37974 | 1.846660 | 23.78 | 0.6205 | 39.405 | 170.317 | |
| 24 | −1,196.82852 | (Variable) | 1.000000 | | | 40.026 | | |
| 25 | 79.36430 | 8.21267 | 1.593490 | 67.00 | 0.5361 | 44.626 | 67.963 | |
| 26* | −79.42798 | 1.00000 | 1.000000 | | | 44.832 | | |
| 27 | 50.71519 | 8.64738 | 1.595220 | 67.74 | 0.5442 | 43.653 | 63.449 | |
| 28 | −140.40648 | 3.00000 | 1.000000 | | | 42.763 | | |
| 29(Stop) | 0.00000 | 3.00000 | 1.000000 | | | 38.257 | | |
| 30 | −141.89558 | 4.69597 | 1.438750 | 94.93 | 0.5343 | 36.487 | 147.217 | |
| 31 | −44.91276 | 1.20000 | 2.003300 | 28.27 | 0.5980 | 35.270 | −29.573 | |
| 32 | 90.82484 | 3.65553 | 1.000000 | | | 34.565 | | |
| 33 | 43.43798 | 9.32967 | 1.567322 | 42.80 | 0.5730 | 35.577 | 46.947 | |
| 34 | −64.39554 | 4.51198 | 1.000000 | | | 34.912 | | |
| 35 | −390.35997 | 1.20000 | 2.001000 | 29.13 | 0.5997 | 30.082 | −18.472 | |
| 36 | 19.60515 | 8.60171 | 1.846660 | 23.78 | 0.6205 | 27.864 | 23.775 | |
| 37 | 439.71049 | 47.72897 | 1.000000 | | | 27.338 | | |
| 38 | 48.66936 | 3.46503 | 1.487490 | 70.23 | 0.5300 | 21.900 | 85.140 | |
| 39 | −281.83788 | 2.99930 | 1.000000 | | | 21.662 | | |
| 40 | −29.21073 | 1.00000 | 1.882997 | 40.76 | 0.5667 | 21.409 | −16.261 | |
| 41 | 29.02380 | 8.12846 | 1.717362 | 29.50 | 0.6048 | 22.778 | 23.868 | |
| 42 | −37.57145 | 4.17658 | 1.000000 | | | 24.194 | | |
| 43 | −25.14632 | 1.00000 | 1.959060 | 17.47 | 0.6599 | 24.658 | −45.180 | *Lrn1 |
| 44 | −60.00000 | 6.39192 | 1.805181 | 25.42 | 0.6161 | 26.354 | 45.784 | |
| 45 | −24.06214 | (BF) | 1.000000 | | | 28.380 | | |

Aspherical surface data

Thirteenth surface

K = 9.53097e+003   A4 = 2.13625e−006   A6 = 2.35842e−011
A8 = 1.78076e−012  A10 = −1.18626e−013 A12 = 9.20951e−016
A14 = −2.97982e−018 A16 = 3.62745e−021

Twenty-sixth surface

K = −8.66996e−001  A4 = 6.94481e−007   A6 = 2.21641e−010
A8 = −8.94793e−013 A10 = 2.80403e−015  A12 = −2.73146e−018
A14 = −1.11047e−021 A16 = 2.79422e−024

Various data
Zoom ratio 18.00

| | Wide angle | Intermediate | Telephoto |
|---|---|---|---|
| Focal length | 50.00 | 500.00 | 900.00 |
| F-number | 4.50 | 4.50 | 7.00 |
| Half angle of view | 17.59 | 1.82 | 1.01 |
| Image height | 15.85 | 15.85 | 15.85 |
| Total lens length | 459.63 | 459.63 | 459.63 |
| BF | 54.45 | 54.45 | 54.45 |
| d12 | 10.00 | 126.09 | 137.43 |
| d21 | 134.83 | 3.41 | 10.89 |
| d24 | 4.97 | 20.30 | 1.48 |
| Entrance pupil position | 173.71 | 1,408.01 | 2,213.08 |
| Exit pupil position | −155.02 | −155.02 | −155.02 |
| Front principal point position | 211.77 | 714.52 | −753.81 |
| Rear principal point position | 4.45 | −445.55 | −845.55 |

-continued

| | | | | Zoom lens unit data | | |
|---|---|---|---|---|---|---|
| Unit | First surface | Focal length | Lens structure length | Front principal point position | Rear principal point position |
| 1 | 1 | 225.00 | 96.10 | 36.20 | −45.03 |
| 2 | 13 | −33.00 | 22.94 | 2.68 | −13.88 |
| 3 | 22 | −114.61 | 4.38 | −0.25 | −2.65 |
| 4 | 25 | 63.62 | 131.95 | 11.07 | −161.85 |

Numerical Embodiment 2

| Surface number | r | d | nd | vd | θgF | Effective diameter | Focal length |
|---|---|---|---|---|---|---|---|
| 1 | 272.82528 | 17.07189 | 1.433870 | 95.10 | 0.5373 | 141.566 | 413.887 |
| 2 | −519.21540 | 0.70000 | 1.000000 | | | 141.021 | |
| 3 | 274.50255 | 17.99082 | 1.433870 | 95.10 | 0.5373 | 135.633 | 356.326 |
| 4 | −348.90472 | 1.00394 | 1.000000 | | | 134.388 | |
| 5 | −343.17738 | 4.00000 | 1.720467 | 34.70 | 0.5834 | 133.559 | −322.961 |
| 6 | 741.83410 | 20.20032 | 1.000000 | | | 129.877 | |
| 7 | 267.51916 | 10.77461 | 1.433870 | 95.10 | 0.5373 | 121.427 | 566.463 |
| 8 | −3,081.31909 | 0.20000 | 1.000000 | | | 120.199 | |
| 9 | 192.82253 | 11.47480 | 1.438750 | 94.93 | 0.5343 | 114.681 | 448.540 |
| 10 | 8,356.13805 | 2.50000 | 1.720467 | 34.70 | 0.5834 | 112.935 | −1,428.832 |
| 11 | 921.96658 | 2.94687 | 1.000000 | | | 110.980 | |
| 12 | 1,979.81742 | 7.58160 | 1.761821 | 26.52 | 0.6135 | 109.380 | 458.946 |
| 13 | −428.50021 | 2.20000 | 1.618000 | 63.33 | 0.5441 | 107.840 | −259.431 |
| 14 | 258.23411 | (Variable) | 1.000000 | | | 102.255 | |
| 15* | −391.62593 | 1.80000 | 1.816000 | 46.62 | 0.5568 | 50.370 | −71.935 |
| 16 | 69.60675 | 7.24201 | 1.000000 | | | 46.594 | |
| 17 | 2,944.28669 | 9.40860 | 1.720467 | 34.70 | 0.5834 | 45.034 | 57.215 |
| 18 | −42.03960 | 1.50000 | 1.595220 | 67.74 | 0.5442 | 44.198 | −70.364 |
| 19 | 179,161.25449 | 1.50000 | 1.000000 | | | 40.970 | |
| 20 | −155.99378 | 1.50000 | 1.595220 | 67.74 | 0.5442 | 40.864 | −76.593 |
| 21 | 64.96898 | 0.10000 | 1.000000 | | | 39.079 | |
| 22 | 52.10475 | 5.18184 | 1.720467 | 34.70 | 0.5834 | 38.978 | 80.254 |
| 23 | 475.67679 | 3.90750 | 1.000000 | | | 38.266 | |
| 24 | −61.79814 | 1.40000 | 1.595220 | 67.74 | 0.5442 | 37.915 | −65.991 |
| 25 | 109.76477 | (Variable) | 1.000000 | | | 37.163 | |
| 26 | 106.27334 | 7.94842 | 1.618000 | 63.33 | 0.5441 | 47.252 | 75.337 |
| 27 | −81.02652 | 0.04492 | 1.000000 | | | 47.302 | |
| 28 | −84.32407 | 1.50000 | 1.834000 | 37.16 | 0.5775 | 47.232 | −90.626 |
| 29* | 782.89559 | 0.20000 | 1.000000 | | | 47.688 | |
| 30 | 97.05428 | 6.71215 | 1.496999 | 81.54 | 0.5374 | 48.384 | 133.735 |
| 31 | −207.97073 | (Variable) | 1.000000 | | | 48.369 | |
| 32* | 94.03572 | 7.03257 | 1.487490 | 70.23 | 0.5300 | 47.567 | 106.365 |
| 33 | −113.60659 | 0.20000 | 1.000000 | | | 47.164 | |
| 34 | 348.44336 | 1.50000 | 1.720467 | 34.70 | 0.5834 | 45.220 | −128.784 |
| 35 | 73.53437 | 0.20000 | 1.000000 | | | 43.670 | |
| 36 | 71.73173 | 5.53351 | 1.496999 | 81.54 | 0.5374 | 43.612 | 127.836 |
| 37 | −555.89638 | (Variable) | 1.000000 | | | 43.011 | |
| 38(Stop) | 0.00000 | 4.42388 | 1.000000 | | | 31.361 | |
| 39 | 227.91443 | 1.40000 | 1.882997 | 40.76 | 0.5667 | 28.543 | −53.086 |
| 40 | 38.95368 | 0.50000 | 1.000000 | | | 27.311 | |
| 41 | 37.49735 | 5.63362 | 1.805181 | 25.42 | 0.6161 | 27.296 | 33.573 |
| 42 | −93.41171 | 0.50000 | 1.000000 | | | 26.539 | |
| 43 | −87.80748 | 1.50000 | 1.910820 | 35.25 | 0.5824 | 26.064 | −35.753 |
| 44 | 52.74342 | 33.00000 | 1.000000 | | | 24.824 | |
| 45 | 158.72918 | 5.15830 | 1.496999 | 81.54 | 0.5374 | 24.854 | 77.846 |
| 46 | −50.80215 | 4.18171 | 1.000000 | | | 24.974 | |
| 47 | −92.90888 | 1.50000 | 1.882997 | 40.76 | 0.5667 | 23.990 | −26.521 |
| 48 | 31.79377 | 6.08428 | 1.603420 | 38.03 | 0.5835 | 24.077 | 43.217 |
| 49 | −139.36936 | 0.50000 | 1.000000 | | | 24.611 | |
| 50 | 251.80189 | 3.88216 | 1.846660 | 23.78 | 0.6205 | 24.832 | 109.662 |
| 51 | −148.33615 | 1.50000 | 2.102050 | 16.77 | 0.6721 | 24.960 | −163.647 *Lrn1 |
| 52 | −789.97540 | (BF) | 1.000000 | | | 25.071 | |

Aspherical surface data

Fifteenth surface

K = −5.04250e+001    A4 = 1.14678e−007    A6 = 1.32623e−011
A8 = 7.90849e−014    A10 = −2.23909e−016    A12 = 4.98827e−020

-continued

Twenty-ninth surface

| | | |
|---|---|---|
| K = 7.91285e+002 | A4 = 2.14195e−007 | A6 = −1.17812e−010 |
| A8 = −2.37195e−013 | A10 = 8.76890e−016 | A12 = −1.32567e−018 |

Thirty-second surface

| | | |
|---|---|---|
| K = −3.37473e+000 | A4 = −4.15778e−007 | A6 = −5.64958e−010 |
| A8 = 1.67442e−012 | A10 = −2.28456e−015 | A12 = 1.15323e−018 |

Various data
Zoom ratio 25.00

| | Wide angle | Intermediate | Telephoto |
|---|---|---|---|
| Focal length | 50.00 | 500.00 | 1,250.00 |
| F-number | 4.50 | 4.50 | 9.00 |
| Half angle of view | 16.17 | 1.66 | 0.66 |
| Image height | 14.50 | 14.50 | 14.50 |
| Total lens length | 497.77 | 497.77 | 497.77 |
| BF | 70.00 | 70.00 | 70.00 |
| d14 | 5.00 | 120.14 | 136.66 |
| d25 | 171.01 | 52.49 | 3.00 |
| d31 | 17.20 | 3.27 | 50.56 |
| d37 | 1.74 | 19.06 | 4.74 |
| Entrance pupil position | 203.45 | 1,866.90 | 5,171.56 |
| Exit pupil position | −60.75 | −60.75 | −60.75 |
| Front principal point position | 234.33 | 454.86 | −5,528.65 |
| Rear principal point position | 20.00 | −430.00 | −1,180.00 |

Zoom lens unit data

| Unit | First surface | Focal length | Lens structure length | Front principal point position | Rear principal point position |
|---|---|---|---|---|---|
| 1 | 1 | 255.31 | 98.64 | 6.55 | −65.77 |
| 2 | 15 | −32.99 | 33.54 | 11.37 | −10.13 |
| 3 | 26 | 102.26 | 16.41 | 3.86 | −6.80 |
| 4 | 32 | 105.81 | 14.47 | 2.52 | −7.26 |
| 5 | 38 | −82.53 | 69.76 | 4.87 | −56.15 |

Numerical Embodiment 3

Unit mm

| Surface number | r | d | nd | vd | θgF | Effective diameter | Focal length |
|---|---|---|---|---|---|---|---|
| 1 | 406.47878 | 12.28861 | 1.433870 | 95.10 | 0.5373 | 100.000 | 308.484 |
| 2 | −198.46029 | 0.34154 | 1.000000 | | | 99.788 | |
| 3 | −194.28909 | 2.50000 | 2.001000 | 29.13 | 0.5997 | 99.715 | −481.597 |
| 4 | −325.78889 | 8.56027 | 1.000000 | | | 100.231 | |
| 5 | 228.52906 | 10.75537 | 1.433870 | 95.10 | 0.5373 | 98.232 | 340.623 |
| 6 | −415.26134 | 0.20000 | 1.000000 | | | 97.698 | |
| 7 | 142.21165 | 12.21295 | 1.438750 | 94.93 | 0.5343 | 93.156 | 261.116 |
| 8 | −581.34773 | 2.40000 | 1.834000 | 37.16 | 0.5775 | 91.883 | −664.564 |
| 9 | 13,786.83743 | 1.00000 | 1.000000 | | | 90.389 | |
| 10 | 649.59069 | 6.97574 | 1.800000 | 29.84 | 0.6017 | 88.779 | 274.774 |
| 11 | −334.63068 | 2.30000 | 1.772499 | 49.60 | 0.5521 | 87.707 | −183.599 |
| 12 | 248.96997 | (Variable) | 1.000000 | | | 83.949 | |
| 13 | −176.57144 | 1.20000 | 1.816000 | 46.62 | 0.5568 | 38.189 | −49.181 |
| 14 | 52.44003 | 5.46088 | 1.000000 | | | 35.856 | |
| 15 | −77.53595 | 1.20000 | 1.496999 | 81.54 | 0.5374 | 35.815 | −138.930 |
| 16 | 651.37425 | 0.10000 | 1.000000 | | | 35.911 | |
| 17 | 96.94892 | 6.78477 | 1.720467 | 34.70 | 0.5834 | 36.015 | 44.434 |
| 18 | −46.86382 | 1.20000 | 1.496999 | 81.54 | 0.5374 | 35.832 | −59.561 |
| 19 | 81.69754 | 0.10000 | 1.000000 | | | 34.058 | |
| 20 | 54.74915 | 2.19243 | 1.720467 | 34.70 | 0.5834 | 33.865 | 287.716 |
| 21 | 72.96934 | 3.97129 | 1.000000 | | | 33.317 | |
| 22 | −76.14663 | 1.20000 | 1.496999 | 81.54 | 0.5374 | 33.250 | −113.412 |
| 23 | 220.59591 | (Variable) | 1.000000 | | | 33.653 | |
| 24 | 272.41520 | 5.26800 | 1.516330 | 64.14 | 0.5352 | 38.839 | 100.505 |
| 25 | −63.97552 | 0.30574 | 1.000000 | | | 39.127 | |
| 26 | −61.94578 | 1.00000 | 1.720467 | 34.70 | 0.5834 | 39.119 | −105.105 |

-continued

| | | | | | | | |
|---|---|---|---|---|---|---|---|
| 27* | −332.60285 | 0.20000 | 1.000000 | | | 40.040 | |
| 28 | 155.71348 | 6.24851 | 1.438750 | 94.93 | 0.5343 | 40.813 | 115.955 |
| 29 | −74.91632 | (Variable) | 1.000000 | | | 41.162 | |
| 30 | 73.79566 | 5.86860 | 1.438750 | 94.93 | 0.5343 | 41.149 | 127.104 |
| 31 | −225.03431 | 0.20000 | 1.000000 | | | 40.793 | |
| 32 | 56.75811 | 1.00000 | 1.720467 | 34.70 | 0.5834 | 39.222 | −94.933 |
| 33 | 30.88313 | 7.76164 | 1.516330 | 64.14 | 0.5352 | 37.322 | 65.004 |
| 34 | 339.04349 | (Variable) | 1.000000 | | | 36.572 | |
| 35(Stop) | 0.00000 | 2.53478 | 1.000000 | | | 27.168 | |
| 36 | −148.62489 | 1.00000 | 1.882997 | 40.76 | 0.5667 | 26.136 | −34.073 |
| 37 | 38.11916 | 5.40036 | 1.728250 | 28.46 | 0.6077 | 25.439 | 36.901 |
| 38 | −88.08198 | 1.50000 | 1.000000 | | | 25.116 | |
| 39 | −1,083.58790 | 1.20000 | 1.834807 | 42.73 | 0.5648 | 24.013 | −89.920 |
| 40 | 81.17695 | 0.50000 | 1.000000 | | | 23.500 | |
| 41 | 26.98567 | 3.50000 | 1.717362 | 29.50 | 0.6048 | 23.056 | 90.708 |
| 42 | 43.35382 | 4.21362 | 1.000000 | | | 21.895 | |
| 43 | 56.98534 | 1.30000 | 1.882997 | 40.76 | 0.5667 | 20.633 | −73.386 |
| 44 | 30.07709 | 16.94298 | 1.000000 | | | 20.129 | |
| 45 | 33.57792 | 3.47509 | 1.438750 | 94.93 | 0.5343 | 23.117 | 91.084 |
| 46 | 200.86452 | 1.00000 | 1.834807 | 42.73 | 0.5648 | 22.933 | −41.478 |
| 47 | 29.60714 | 10.00000 | 1.000000 | | | 22.620 | |
| 48 | 117.95528 | 1.00000 | 1.808095 | 22.76 | 0.6307 | 27.256 | −49.074 *Lrn1 |
| 49 | 29.79331 | 8.00000 | 1.739998 | 28.30 | 0.6078 | 27.922 | 43.692 |
| 50 | 306.18726 | 7.24615 | 1.000000 | | | 29.065 | |
| 51 | 48.17819 | 6.12129 | 1.516330 | 64.14 | 0.5352 | 34.000 | 70.260 |
| 52 | −142.62868 | (BF) | 1.000000 | | | 34.088 | |

Aspherical surface data
Twenty-seventh surface

K = 1.41981e+002   A4 = 8.95585e−007   A6 = 5.44963e−010
A8 = −6.93086e−013   A10 = 2.14094e−015   A12 = −9.49646e−019

Various data
Zoom ratio 10.00

| | Wide angle | Intermediate | Telephoto |
|---|---|---|---|
| Focal length | 50.00 | 99.70 | 500.00 |
| F-number | 4.00 | 4.00 | 5.00 |
| Half angle of view | 17.28 | 8.86 | 1.78 |
| Image height | 15.55 | 15.55 | 15.55 |
| Total lens length | 381.24 | 381.24 | 381.24 |
| BF | 50.03 | 50.03 | 50.03 |
| d12 | 3.44 | 47.19 | 112.80 |
| d23 | 100.00 | 60.95 | 1.66 |
| d29 | 39.54 | 25.39 | 11.84 |
| d34 | 2.49 | 11.95 | 19.17 |
| Entrance pupil position | 115.88 | 261.72 | 1,314.02 |
| Exit pupil position | −140.35 | −140.35 | −140.35 |
| Front principal point position | 152.75 | 309.21 | 500.88 |
| Rear principal point position | 0.03 | −49.67 | −449.97 |

Zoom lens unit data

| Unit | First surface | Focal length | Lens structure length | Front principal point position | Rear principal point position |
|---|---|---|---|---|---|
| 1 | 1 | 205.00 | 59.53 | 9.48 | −31.61 |
| 2 | 13 | −34.50 | 23.41 | 4.95 | −11.28 |
| 3 | 24 | 110.50 | 13.02 | 6.46 | −2.56 |
| 4 | 30 | 80.00 | 14.83 | 1.23 | −8.68 |
| 5 | 35 | −669.42 | 74.93 | −291.44 | −656.50 |

Numerical Embodiment 4

Unit mm

| Surface number | r | d | nd | vd | θgF | Effective diameter | Focal length |
|---|---|---|---|---|---|---|---|
| 1 | 168.17152 | 16.79129 | 1.487490 | 70.23 | 0.5300 | 128.571 | 318.275 |
| 2 | −2,027.74956 | 1.00000 | 1.000000 | | | 127.768 | |
| 3 | 161.25029 | 3.40000 | 1.729157 | 54.68 | 0.5444 | 21.704 | −419.290 |

-continued

| | | | | | | | |
|---|---|---|---|---|---|---|---|
| 4 | 104.78570 | 5.73864 | 1.000000 | | | 116.320 | |
| 5 | 117.63255 | 22.65980 | 1.433870 | 95.10 | 0.5373 | 115.983 | 210.243 |
| 6 | −386.82440 | 1.50000 | 1.000000 | | | 114.749 | |
| 7 | −306.41329 | 3.20000 | 1.729157 | 54.68 | 0.5444 | 114.458 | −162.717 |
| 8 | 195.85783 | 16.91749 | 1.000000 | | | 110.563 | |
| 9 | 151.52542 | 17.60916 | 1.433870 | 95.10 | 0.5373 | 110.936 | 253.550 |
| 10 | −390.92250 | 0.20000 | 1.000000 | | | 110.230 | |
| 11 | 144.45426 | 6.74312 | 1.433870 | 95.10 | 0.5373 | 103.945 | 867.749 |
| 12 | 230.70811 | (Variable) | 1.000000 | | | 102.395 | |
| 13* | −61,445.90829 | 1.20000 | 1.772499 | 49.60 | 0.5521 | 31.641 | −38.466 |
| 14 | 29.87274 | 5.79166 | 1.000000 | | | 28.842 | |
| 15 | −179.50273 | 1.00000 | 1.618000 | 63.33 | 0.5441 | 28.516 | −43.497 |
| 16 | 31.82389 | 7.23979 | 1.720467 | 34.70 | 0.5834 | 28.173 | 32.279 |
| 17 | −80.13943 | 3.07785 | 1.000000 | | | 28.187 | |
| 18 | −36.54541 | 1.00000 | 1.618000 | 63.33 | 0.5441 | 28.068 | −52.256 |
| 19 | 289.89472 | 0.20000 | 1.000000 | | | 29.176 | |
| 20 | 75.96714 | 2.97040 | 1.548141 | 45.79 | 0.5685 | 29.841 | 141.151 |
| 21 | 32,28.06212 | (Variable) | 1.000000 | | | 30.098 | |
| 22 | −72.55380 | 1.00000 | 1.729157 | 54.68 | 0.5444 | 37.866 | −68.793 |
| 23 | 165.80530 | 3.37707 | 1.846660 | 23.78 | 0.6205 | 39.477 | 171.404 |
| 24 | −1,250.63076 | (Variable) | 1.000000 | | | 40.094 | |
| 25 | 79.33529 | 8.19359 | 1.593490 | 67.00 | 0.5361 | 44.670 | 68.297 |
| 26* | −80.26509 | 1.00000 | 1.000000 | | | 44.873 | |
| 27 | 51.55331 | 8.57225 | 1.595220 | 67.74 | 0.5442 | 43.700 | 64.179 |
| 28 | −140.21768 | 3.00000 | 1.000000 | | | 42.825 | |
| 29(Stop) | 0.00000 | 3.00000 | 1.000000 | | | 38.364 | |
| 30 | −142.11332 | 4.76757 | 1.438750 | 94.93 | 0.5343 | 36.620 | 146.427 |
| 31 | −44.77462 | 1.20000 | 2.003300 | 28.27 | 0.5980 | 35.396 | −29.204 |
| 32 | 88.03518 | 3.38000 | 1.000000 | | | 34.719 | |
| 33 | 43.52369 | 9.39948 | 1.567322 | 42.80 | 0.5730 | 35.831 | 47.019 |
| 34 | −64.41710 | 4.56178 | 1.000000 | | | 35.214 | |
| 35 | −388.52623 | 1.20000 | 2.001000 | 29.13 | 0.5997 | 30.486 | −18.820 |
| 36 | 19.99814 | 9.24405 | 1.846660 | 23.78 | 0.6205 | 28.326 | 23.896 |
| 37 | 741.61470 | 47.48669 | 1.000000 | | | 27.753 | |
| 38 | 49.57313 | 3.43801 | 1.487490 | 70.23 | 0.5300 | 21.934 | 86.702 |
| 39 | −286.82028 | 3.00000 | 1.000000 | | | 21.697 | |
| 40 | −32.72213 | 1.00000 | 1.882997 | 40.76 | 0.5667 | 21.395 | −17.136 |
| 41 | 28.86193 | 7.77589 | 1.717362 | 29.50 | 0.6048 | 22.471 | 24.634 |
| 42 | −41.26782 | 4.25931 | 1.000000 | | | 23.682 | |
| 43 | −25.23172 | 1.00000 | 1.922860 | 18.90 | 0.6495 | 24.053 | −47.262 *Lrn1 |
| 44 | −60.00000 | 6.51963 | 1.755199 | 27.51 | 0.6103 | 25.577 | 49.857 |
| 45 | −24.34832 | (BF) | 1.000000 | | | 27.670 | |

Aspherical surface data

Thirteenth surface

K = −3.48919e+007   A4 = 2.17488e−006   A6 = 3.54954e−011
A8 = 2.85487e−012   A10 = −1.19682e−013   A12 = 9.06744e−016
A14 = −2.93122e−018   A16 = 3.59320e−021

Twenty-sixth surface

K = −8.31103e−001   A4 = 6.85381e−007   A6 = 2.10481e−010
A8 = −9.00798e−013   A10 = 2.80534e−015   A12 = −2.73219e−018
A14 = −1.12925e−021   A16 = 2.81156e−024

Various data
Zoom ratio 18.00

| | Wide angle | Intermediate | Telephoto |
|---|---|---|---|
| Focal length | 50.00 | 500.00 | 900.00 |
| F-number | 4.50 | 4.50 | 7.00 |
| Half angle of view | 17.59 | 1.82 | 1.01 |
| Image height | 15.85 | 15.85 | 15.85 |
| Total lens length | 460.00 | 460.00 | 460.00 |
| BF | 55.00 | 55.00 | 55.00 |
| d12 | 10.00 | 126.17 | 137.50 |
| d21 | 135.42 | 3.73 | 11.39 |
| d24 | 4.97 | 20.48 | 1.50 |
| Entrance pupil position | 173.35 | 1,408.49 | 2,214.03 |
| Exit pupil position | −139.41 | −139.41 | −139.41 |
| Front principal point position | 210.49 | 622.53 | −1,052.50 |
| Rear principal point position | 5.00 | −445.00 | −845.00 |

-continued

| | | | Zoom lens unit data | | |
|---|---|---|---|---|---|
| Unit | First surface | Focal length | Lens structure length | Front principal point position | Rear principal point position |
| 1 | 1 | 225.00 | 95.76 | 36.05 | −45.00 |
| 2 | 13 | −33.00 | 22.48 | 2.63 | −13.59 |
| 3 | 22 | −115.61 | 4.38 | −0.24 | −2.64 |
| 4 | 25 | 60.37 | 132.00 | 6.15 | −149.71 |

Numerical Embodiment 5

| Surface number | r | d | nd | vd | θgF | Effective diameter | Focal length | |
|---|---|---|---|---|---|---|---|---|
| 1 | 173.09677 | 17.19123 | 1.433870 | 95.10 | 0.5373 | 142.857 | 433.111 | |
| 2 | 2,068.61703 | 0.20000 | 1.000000 | | | 142.054 | | |
| 3 | 178.37783 | 5.00000 | 1.654115 | 39.70 | 0.5737 | 137.486 | −882.481 | |
| 4 | 134.94202 | 2.65879 | 1.000000 | | | 132.782 | | |
| 5 | 154.39674 | 14.72328 | 1.433870 | 95.10 | 0.5373 | 132.747 | 437.323 | |
| 6 | 796.17585 | 16.96519 | 1.000000 | | | 131.743 | | |
| 7 | 325.78028 | 7.55886 | 1.433870 | 95.10 | 0.5373 | 121.692 | 772.440 | |
| 8 | 10,655.46140 | 0.20000 | 1.000000 | | | 120.450 | | |
| 9 | 197.67721 | 13.58096 | 1.438750 | 94.93 | 0.5343 | 114.517 | 343.828 | |
| 10 | −630.19108 | 5.00000 | 1.834000 | 37.16 | 0.5775 | 112.792 | −536.012 | |
| 11 | 1,578.12385 | 3.00000 | 1.000000 | | | 108.834 | | |
| 12 | −4,824.61806 | 6.01458 | 1.808095 | 22.76 | 0.6307 | 107.347 | 442.254 | |
| 13 | −336.11859 | 5.00000 | 1.737999 | 32.26 | 0.5899 | 106.463 | −241.676 | |
| 14 | 388.43363 | (Variable) | 1.000000 | | | 100.693 | | |
| 15* | 171.18315 | 1.20000 | 1.772499 | 49.60 | 0.5521 | 40.175 | −58.428 | |
| 16 | 35.74372 | 5.81769 | 1.000000 | | | 36.306 | | |
| 17 | 1,220.06047 | 1.00000 | 1.618000 | 63.33 | 0.5441 | 35.755 | −48.930 | |
| 18 | 29.60664 | 8.08793 | 1.720467 | 34.70 | 0.5834 | 33.642 | 42.738 | |
| 19 | 582.39152 | 4.47557 | 1.000000 | | | 32.403 | | |
| 20 | −34.42943 | 1.00000 | 1.496999 | 81.54 | 0.5374 | 32.238 | −54.498 | |
| 21 | 129.98076 | 2.53906 | 1.720467 | 34.70 | 0.5834 | 32.008 | 170.598 | |
| 22 | −2,559.87336 | (Variable) | 1.000000 | | | 31.910 | | |
| 23 | −77.96339 | 1.00000 | 1.754998 | 52.32 | 0.5476 | 30.067 | −63.360 | |
| 24 | 125.95540 | 2.50617 | 1.854780 | 24.80 | 0.6121 | 30.978 | 141.962 | |
| 25 | −4,422.77254 | (Variable) | 1.000000 | | | 31.338 | | |
| 26(Stop) | 0.00000 | (Variable) | 1.000000 | | | 39.838 | | |
| 27 | 138.47897 | 5.73050 | 1.589130 | 61.14 | 0.5406 | 41.136 | 99.087 | |
| 28 | −100.03548 | 0.20000 | 1.000000 | | | 41.452 | | |
| 29 | 101.56964 | 6.91085 | 1.487490 | 70.23 | 0.5300 | 41.452 | 91.887 | |
| 30 | −78.82238 | 0.20000 | 1.000000 | | | 41.174 | | |
| 31 | 62.40640 | 9.55685 | 1.438750 | 94.93 | 0.5343 | 38.231 | 65.553 | |
| 32 | −51.08972 | 1.20000 | 1.882997 | 40.76 | 0.5667 | 36.510 | −31.628 | |
| 33 | 63.08850 | 0.20000 | 1.000000 | | | 35.092 | | |
| 34 | 32.64597 | 6.28516 | 1.589130 | 61.14 | 0.5406 | 35.485 | 67.626 | |
| 35 | 164.93864 | 18.61837 | 1.000000 | | | 34.734 | | |
| 36 | −1,766.20608 | 1.20000 | 2.001000 | 29.13 | 0.5997 | 26.634 | −19.793 | |
| 37 | 20.20907 | 6.79907 | 1.805181 | 25.42 | 0.6161 | 25.921 | 24.585 | |
| 38 | −1,486.97393 | 50.00000 | 1.000000 | | | 26.014 | | |
| 39 | 134.29451 | 3.32714 | 1.516330 | 64.14 | 0.5352 | 29.513 | 159.186 | |
| 40 | −212.08959 | 3.00000 | 1.000000 | | | 29.452 | | |
| 41 | 487.64832 | 7.01423 | 1.728250 | 28.46 | 0.6077 | 29.010 | 31.735 | |
| 42 | −24.32290 | 1.00000 | 1.882997 | 40.76 | 0.5667 | 28.817 | −28.987 | |
| 43 | −449.05111 | 6.50329 | 1.000000 | | | 29.010 | | |
| 44 | −27.14461 | 1.00000 | 1.959060 | 17.47 | 0.6599 | 29.034 | −56.615 | *Lrn1 |
| 45 | −54.54720 | 4.85501 | 1.805181 | 25.42 | 0.6161 | 30.826 | 60.651 | |
| 46 | −26.92517 | (BF) | 1.000000 | | | 31.929 | | |

Aspherical surface data
Fifteenth surface

K = 4.62445e+000　　A4 = 1.02225e−006　　A6 = 1.07712e−010
A8 = −1.23696e−012　A10 = 1.27284e−014　A12 = −4.13160e−017
A14 = 7.08727e−020　A16 = −4.66537e−023

-continued

Various data
Zoom ratio 20.00

|  | Wide angle | Intermediate | Telephoto |
|---|---|---|---|
| Focal length | 50.00 | 500.00 | 1,000.00 |
| F-number | 4.50 | 4.50 | 7.00 |
| Half angle of view | 16.49 | 1.70 | 0.85 |
| Image height | 14.80 | 14.80 | 14.80 |
| Total lens length | 455.49 | 455.49 | 455.49 |
| BF | 52.00 | 52.00 | 52.00 |
| d14 | 1.00 | 111.36 | 123.12 |
| d22 | 123.57 | 2.60 | 19.59 |
| d25 | 19.20 | 29.81 | 1.06 |
| Entrance pupil position | 190.31 | 1,566.42 | 2,467.29 |
| Exit pupil position | −172.68 | −172.68 | −172.68 |
| Front principal point position | 229.19 | 953.73 | −983.50 |
| Rear principal point position | 2.00 | −448.00 | −948.00 |

Zoom lens unit data

| Unit | First surface | Focal length | Lens structure length | Front principal point position | Rear principal point position |
|---|---|---|---|---|---|
| 1 | 1 | 240.00 | 97.09 | −5.50 | −72.14 |
| 2 | 15 | −34.10 | 24.12 | 6.86 | −10.02 |
| 3 | 23 | −115.00 | 3.51 | −0.10 | −2.01 |
| 4 | 26 | 69.81 | 135.00 | 14.68 | −154.09 |

Numerical Embodiment 6

| Surface number | r | d | nd | vd | θgF | Effective diameter | Focal length |
|---|---|---|---|---|---|---|---|
| 1 | 168.12614 | 16.76377 | 1.487490 | 70.23 | 0.5300 | 128.571 | 318.920 |
| 2 | −2,091.86807 | 1.00000 | 1.000000 |  |  | 127.767 |  |
| 3 | 160.79591 | 3.40000 | 1.729157 | 54.68 | 0.5444 | 121.714 | −422.245 |
| 4 | 104.84141 | 5.77002 | 1.000000 |  |  | 116.348 |  |
| 5 | 117.90742 | 22.60059 | 1.433870 | 95.10 | 0.5373 | 116.007 | 210.895 |
| 6 | −389.17455 | 1.50000 | 1.000000 |  |  | 114.772 |  |
| 7 | −306.38566 | 3.20000 | 1.729157 | 54.68 | 0.5444 | 114.504 | −162.146 |
| 8 | 194.74715 | 16.92373 | 1.000000 |  |  | 110.604 |  |
| 9 | 150.79126 | 18.11204 | 1.433870 | 95.10 | 0.5373 | 11.052 | 251.833 |
| 10 | −385.80019 | 0.20000 | 1.000000 |  |  | 10.267 |  |
| 11 | 147.11699 | 6.74029 | 1.433870 | 95.10 | 0.5373 | 04.029 | 868.168 |
| 12 | 237.66696 | (Variable) | 1.000000 |  |  | 02.487 |  |
| 13* | −3,263.15805 | 1.20000 | 1.772499 | 49.60 | 0.5521 | 31.396 | −39.163 |
| 14 | 30.68975 | 5.66651 | 1.000000 |  |  | 28.701 |  |
| 15 | −170.60120 | 1.00000 | 1.618000 | 63.33 | 0.5441 | 28.353 | −43.166 |
| 16 | 31.83400 | 7.14433 | 1.720467 | 34.70 | 0.5834 | 27.983 | 32.453 |
| 17 | −81.83674 | 3.07345 | 1.000000 |  |  | 27.626 |  |
| 18 | −36.09544 | 1.00000 | 1.618000 | 63.33 | 0.5441 | 27.185 | −49.966 |
| 19 | 221.67586 | 0.20000 | 1.000000 |  |  | 28.287 |  |
| 20 | 82.48216 | 3.02161 | 1.548141 | 45.79 | 0.5685 | 28.826 | 127.629 |
| 21 | −470.77061 | (Variable) | 1.000000 |  |  | 29.131 |  |
| 22 | −71.38988 | 1.00000 | 1.729157 | 54.68 | 0.5444 | 37.644 | −67.436 |
| 23 | 161.17426 | 3.38892 | 1.846660 | 23.78 | 0.6205 | 39.279 | 168.322 |
| 24 | −1,331.54098 | (Variable) | 1.000000 |  |  | 39.900 |  |
| 25 | 79.58805 | 8.40792 | 1.593490 | 67.00 | 0.5361 | 44.477 | 65.727 |
| 26* | −74.00677 | 1.00000 | 1.000000 |  |  | 44.689 |  |
| 27 | 51.42027 | 8.46382 | 1.595220 | 67.74 | 0.5442 | 43.289 | 63.987 |
| 28 | −139.72405 | 3.00000 | 1.000000 |  |  | 42.389 |  |
| 29(Stop) | 0.00000 | 3.00000 | 1.000000 |  |  | 37.849 |  |
| 30 | −121.77540 | 4.96980 | 1.438750 | 94.93 | 0.5343 | 36.232 | 156.629 |
| 31 | −44.54922 | 1.20000 | 2.003300 | 28.27 | 0.5980 | 34.760 | −28.555 |
| 32 | 83.29495 | 2.38719 | 1.000000 |  |  | 34.078 |  |
| 33 | 43.57564 | 8.20549 | 1.567322 | 42.80 | 0.5730 | 34.998 | 46.939 |
| 34 | −64.70874 | 4.23524 | 1.000000 |  |  | 34.598 |  |
| 35 | −360.69422 | 1.20000 | 2.001000 | 29.13 | 0.5997 | 30.457 | −19.858 |
| 36 | 21.25323 | 8.99968 | 1.846660 | 23.78 | 0.6205 | 28.552 | 24.893 |
| 37 | 11,639.63044 | 50.00000 | 1.000000 |  |  | 28.016 |  |
| 38 | 66.26537 | 2.72599 | 1.487490 | 70.23 | 0.5300 | 21.479 | 163.228 |
| 39 | 384.41465 | 3.20471 | 1.000000 |  |  | 21.310 |  |

-continued

| | | | | | | | | |
|---|---|---|---|---|---|---|---|---|
| 40 | −29.80871 | 1.00000 | 1.882997 | 40.76 | 0.5667 | 21.200 | −24.698 | |
| 41 | 84.35944 | 5.62751 | 1.717362 | 29.50 | 0.6048 | 22.310 | 46.449 | |
| 42 | −54.24447 | 2.36812 | 1.000000 | | | 23.595 | | |
| 43 | −98.21170 | 1.00000 | 1.959060 | 17.47 | 0.6599 | 24.454 | −49.031 | *Lrn1 |
| 44 | 93.02995 | 3.00000 | 1.000000 | | | 25.170 | | |
| 45 | 135.54853 | 8.69930 | 1.805181 | 25.42 | 0.6161 | 27.734 | 38.292 | |
| 46 | −39.22808 | (BF) | 1.000000 | | | 29.561 | | |

Aspherical surface data

Thirteenth surface

K = −1.47298e+004   A4 = 2.06990e−006   A6 = 1.37511e−010
A8 = 2.66079e−012   A10 = −1.27210e−013   A12 = 9.21984e−016
A14 = −2.74030e−018   A16 = 3.05848e−021

Twenty-sixth surface

K = −7.89368e−001   A4 = 6.71375e−007   A6 = 1.90626e−010
A8 = −8.63493e−013   A10 = 2.80709e−015   A12 = −2.82637e−018
A14 = −1.26676e−021   A16 = 3.01967e−024

Various data
Zoom ratio 18.00

| | Wide angle | Intermediate | Telephoto |
|---|---|---|---|
| Focal length | 50.00 | 500.00 | 900.00 |
| F-number | 4.50 | 4.50 | 7.00 |
| Half angle of view | 17.59 | 1.82 | 1.01 |
| Image height | 15.85 | 15.85 | 15.85 |
| Total lens length | 460.00 | 460.00 | 460.00 |
| BF | 55.00 | 55.00 | 55.00 |
| d12 | 10.00 | 126.09 | 137.49 |
| d21 | 134.47 | 3.15 | 10.41 |
| d24 | 4.93 | 20.16 | 1.50 |
| Entrance pupil position | 173.77 | 1,398.03 | 2,193.81 |
| Exit pupil position | −194.87 | −194.87 | −194.87 |
| Front principal point position | 213.76 | 897.52 | −147.82 |
| Rear principal point position | 5.00 | −445.00 | −845.00 |

Zoom lens unit data

| Unit | First surface | Focal length | Lens structure length | Front principal point position | Rear principal point position |
|---|---|---|---|---|---|
| 1 | 1 | 225.00 | 96.21 | 36.49 | −45.00 |
| 2 | 13 | −33.00 | 22.31 | 2.65 | −13.48 |
| 3 | 22 | −113.18 | 4.39 | −0.22 | −2.63 |
| 4 | 25 | 71.79 | 132.69 | 23.20 | −190.10 |

TABLE 1

| | | Embodiment | | | | | |
|---|---|---|---|---|---|---|---|
| | | 1 | 2 | 3 | 4 | 5 | 6 |
| Focal length at wide angle end: fw | | 50.00 | 50.00 | 50.00 | 50.00 | 50.00 | 50.00 |
| Focal length at telephoto end: ft | | 900.00 | 1,250.00 | 500.00 | 900.00 | 1,000.00 | 900.00 |
| Half angle of view at wide angle end: ωw | | 17.59 | 16.17 | 17.28 | 17.59 | 16.49 | 17.59 |
| Focal length of first lens unit: f1 | | 225.00 | 255.31 | 205.00 | 225.00 | 240.00 | 225.00 |
| Focal length of second lens unit: f2 | | −33.00 | −32.99 | −34.50 | −33.00 | −34.10 | −33.00 |
| Focal length of third lens unit: f3 | | −114.61 | 102.26 | 110.50 | −115.61 | −115.00 | −113.18 |
| Focal length of fourth lens unit: f4 | | 63.62 | 105.81 | 80.00 | 60.37 | 69.81 | 71.79 |
| Focal length of fifth lens unit: f5 | | — | −82.53 | −669.42 | — | — | — |
| Total lens length: TD | | 405.18 | 427.77 | 331.21 | 405.00 | 403.49 | 405.00 |
| Distance from stop to Lrn1: Drn1 | | 103.69 | 68.26 | 52.57 | 103.71 | 127.75 | 99.12 |
| Conditional expression (1) | (θgf2p−θgf2n)/(ν2p−ν2n) | −1.58E−03 | −1.30E−03 | −1.08E−03 | −1.58E−03 | −1.29E−03 | −1.58E−03 |
| Conditional expression (2) | Δθgf | 0.0465 | 0.0577 | 0.0260 | 0.0385 | 0.0465 | 0.0465 |
| Conditional expression (3) | Drn1/TD | 0.2559 | 0.1596 | 0.1587 | 0.2561 | 0.3166 | 0.2447 |

TABLE 1-continued

| | | Embodiment | | | | | |
|---|---|---|---|---|---|---|---|
| | | 1 | 2 | 3 | 4 | 5 | 6 |
| Conditional expression (4) | θgfrn1 | 0.6598 | 0.6721 | 0.6307 | 0.6495 | 0.6598 | 0.6598 |
| Conditional expression (5) | (θgf1p-θgf1n)/(v1p-v1n) | -2.61E-04 | -4.95E-04 | -5.93E-04 | -2.60E-04 | -5.60E-04 | -2.61E-04 |
| Conditional expression (6) | f1/f2 | -6.8182 | -7.7390 | -5.9420 | -6.8182 | -7.0381 | -6.8182 |
| Conditional expression (7) | ft/f1 | 4.0 | 4.9 | 2.4 | 4.0 | 4.2 | 4.0 |
| Conditional expression (8) | vdrn1 | 17.47 | 16.77 | 22.76 | 18.90 | 17.47 | 17.47 |
| Conditional expression (9) | (θgfrp1-θgfrn1)/(vdrp1-vdrn1) | -5.51E-03 | -7.36E-03 | -4.13E-03 | -4.55E-03 | -5.51E-03 | — |

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2014-168478, filed Aug. 21, 2014, which is hereby incorporated by reference herein in its entirety.

What is claimed is:

1. A zoom lens having a wide angle end and a telephoto end, comprising:
a first lens unit having a positive refractive power that does not move for zooming;
a second lens unit having a negative refractive power that moves during zooming and comprising at least one positive lens and at least one negative lens;
at least one other lens unit that moves during zooming as at least a third lens unit;
a rearmost lens unit disposed closest to an image side that does not move for zooming and comprising at least one negative lens, wherein the first lens unit, the second lens unit, the at least one other lens unit, and the rearmost lens unit are arranged in the stated order from an object side to the image side; and
an aperture stop arranged in the image side of the second lens unit,
wherein the following conditions are satisfied:

$$-2.00 \times 10^{-3} < (\theta gf2p - \theta gf2n)/(vd2p - vd2n) < -0.80 \times 10^{-3};$$

$$0.0180 < \Delta\theta gfrn1 < 0.070; \text{ and}$$

$$0.10 < Drn1/TD < 0.40,$$

where vd2p and vd2n respectively represent average values of Abbe numbers of positive lenses and negative lenses forming the second lens unit, θgf2p and θgf2n respectively represent average values of relative partial dispersions of the positive lenses and the negative lenses forming the second lens unit, Δθgfrn1 represents anomalous dispersion of a lens having a smallest Abbe number among negative lenses forming the rearmost lens unit, TD represents a distance on an optical axis from a surface vertex position of a lens surface closest to the object side of the zoom lens to a surface vertex position of a lens surface closest to the image side of the zoom lens, and Drn1 represents a distance between the aperture stop and the lens having the smallest Abbe number among the negative lenses forming the rearmost lens unit, at the wide angle end of the zoom lens,
provided that:
an Abbe number vd is expressed as:

$$vd = (Nd-1)/(NF-NC),$$

where NF represents a refractive index with respect to an F-line, Nd represents a refractive index with respect to a d-line, and NC represents a refractive index with respect to a C-line,
a relative partial dispersion θgf is expressed as:

$$\theta gf = (Ng-NF)/(NF-NC),$$

where Ng represents a refractive index with respect to a g-line, and
anomalous dispersion Δθgf is expressed using the relative partial dispersion θgf and the Abbe number vd as:

$$\Delta\theta gf = \theta gf - (-1.6220 \times 10^{-3} \times vd + 0.6416).$$

2. The zoom lens according to claim 1, wherein the following condition is satisfied:

$$0.62 < \theta gfrn1 < 0.70,$$

where θgfrn1 represents a relative partial dispersion of the lens having the smallest Abbe number among the negative lenses forming the rearmost lens unit.

3. The zoom lens according to claim 1, wherein the first lens unit comprises at least one positive lens and at least one negative lens, and the following condition is satisfied:

$$-7.0 \times 10^{-4} < (\theta gf1p - \theta gf1n)/(v1p - v1n) < -2.0 \times 10^{-4},$$

where v1p and θgf1p respectively represent an average value of Abbe numbers and an average value of relative partial dispersions of positive lenses forming the first lens unit, and v1n and θgf1n respectively represent an average value of Abbe numbers and an average value of relative partial dispersions of negative lenses forming the first lens unit.

4. The zoom lens according to claim 1, wherein the following condition is satisfied:

$$-8.50 < f1/f2 < -4.00,$$

where f1 represents a focal length of the first lens unit, and f2 represents a focal length of the second lens unit.

5. The zoom lens according to claim 1, wherein the following condition is satisfied:

$$2.0 < ft/f1 < 5.5,$$

where ft represents a focal length at the telephoto end of the zoom lens, and f1 represents a focal length of the first lens unit.

6. The zoom lens according to claim 1, wherein the following condition is satisfied:

$$14 < \nu drn1 < 24,$$

where νdrn1 represents an Abbe number of the lens having the smallest Abbe number among the negative lenses forming the rearmost lens unit.

7. The zoom lens according to claim 1,
wherein the lens having the smallest Abbe number among the negative lenses forming the rearmost lens unit is cemented with one positive lens, and
wherein the following condition is satisfied:

$$-8.40 \times 10^{-3} < (\theta gfrp1 - \theta gfrn1)/(\nu drp1 - \nu drn1) < -3.50 \times 10^{-3},$$

where νdrn1 and θgfrn1 respectively represent an Abbe number and a relative partial dispersion of the lens having the smallest Abbe number among the negative lenses forming the rearmost lens unit, and νdrp1 and θgfrp1 respectively represent an Abbe number of the one positive lens and a relative partial dispersion of the one positive lens.

8. An image pickup apparatus, comprising:
a zoom lens having a wide angle end and a telephoto end, comprising:
  a first lens unit having a positive refractive power that does not move for zooming;
  a second lens unit having a negative refractive power that moves during zooming and comprising at least one positive lens and at least one negative lens;
  at least one other lens unit that moves during zooming as at least a third lens unit;
  a rearmost lens unit disposed closest to an image side that does not move for zooming and comprising at least one negative lens,
    wherein the first lens unit, the second lens unit, the at least one other lens unit, and the rearmost lens unit are arranged in the stated order from an object side to the image side; and
  an aperture stop arranged in the image side of the second lens unit, wherein the following conditions are satisfied:

$$-2.00 \times 10^{-3} < (\theta gf2p - \theta gf2n)/(\nu d2p - \nu d2n) < -0.80 \times 10^{-3};$$

$$0.0180 < \Delta\theta gfrn1 < 0.070;\ \text{and}$$

$$0.10 < Drn1/TD < 0.40,$$

where νd2p and νd2n respectively represent average values of Abbe numbers of positive lenses and negative lenses forming the second lens unit, θgf2p and θgf2n respectively represent average values of relative partial dispersions of the positive lenses and the negative lenses forming the second lens unit, Δθgfrn1 represents anomalous dispersion of a lens having a smallest Abbe number among negative lenses forming the rearmost lens unit, TD represents a distance on an optical axis from a surface vertex position of a lens surface closest to the object side of the zoom lens to a surface vertex position of a lens surface closest to the image side of the zoom lens, and Drn1 represents a distance between the aperture stop and the lens having the smallest Abbe number among the negative lenses forming the rearmost lens unit, at the wide angle end of the zoom lens,
provided that:
an Abbe number νd is expressed as:

$$\nu d = (Nd-1)/(NF-NC),$$

where NF represents a refractive index with respect to an F-line, Nd represents a refractive index with respect to a d-line, and NC represents a refractive index with respect to a C-line,
a relative partial dispersion θgf is expressed as:

$$\theta gf = (Ng-NF)/(NF-NC),$$

where Ng represents a refractive index with respect to a g-line, and
anomalous dispersion Δθgf is expressed using the relative partial dispersion θgf and the Abbe number νd as:

$$\Delta\theta gf = \theta gf - (-1.6220 \times 10^{-3} \times \nu d + 0.6416);\ \text{and}$$

a solid-state image pickup element configured to receive an image formed by the zoom lens.

* * * * *